(12) United States Patent
Campbell et al.

(10) Patent No.: US 10,696,819 B2
(45) Date of Patent: Jun. 30, 2020

(54) ULTRAVIOLET LIGHT STABILIZING POLYMERIC FILLER MATERIALS

(71) Applicant: International Business Machines Corporation, Armonk, NY (US)

(72) Inventors: Eric J. Campbell, Rochester, MN (US); Sarah K. Czaplewski-Campbell, Rochester, MN (US); Brandon M. Kobilka, Tucson, AZ (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/787,801

(22) Filed: Oct. 19, 2017

(65) Prior Publication Data

US 2019/0119470 A1    Apr. 25, 2019

(51) Int. Cl.

| | | |
|---|---|---|
| *C08K 9/04* | (2006.01) | |
| *C08K 5/544* | (2006.01) | |
| *C08K 3/36* | (2006.01) | |
| *C07F 9/6518* | (2006.01) | |
| *C07F 9/6558* | (2006.01) | |
| *C09D 7/62* | (2018.01) | |
| *C08K 9/06* | (2006.01) | |

(52) U.S. Cl.
CPC ............ *C08K 9/04* (2013.01); *C07F 9/65188* (2013.01); *C07F 9/65583* (2013.01); *C07F 9/65586* (2013.01); *C08K 5/5442* (2013.01); *C08K 9/06* (2013.01); *C09D 7/62* (2018.01); *C08K 3/36* (2013.01)

(58) Field of Classification Search
CPC ....................................................... C08K 9/04
See application file for complete search history.

(56) References Cited

U.S. PATENT DOCUMENTS

| | | |
|---|---|---|
| 5,009,669 A | 4/1991 | Jöllenbeck et al. |
| 6,358,601 B1 | 3/2002 | Bilkadi |
| 7,109,260 B2 | 9/2006 | Kaprinidis et al. |
| 8,633,265 B2 | 1/2014 | Hurst et al. |
| 8,753,739 B2 | 6/2014 | Buckel et al. |
| 9,150,701 B2 | 10/2015 | Destro et al. |
| 10,030,090 B1 | 7/2018 | King et al. |
| 10,125,206 B1 | 11/2018 | King et al. |
| 10,287,381 B2 | 5/2019 | King et al. |
| 10,428,198 B2 | 10/2019 | Boday et al. |

(Continued)

FOREIGN PATENT DOCUMENTS

WO    WO 2006/041221 A1    4/2006

OTHER PUBLICATIONS

Farkas et al., *Synthesis of New 2-(2'Hydroxyaryl)benzotriazoles and Evaluation of Their Photochemical Behavior as Potential UV-Filters*, Molecules, vol. 15, Issue 9, Sep. 3, 2010, pp. 6205-6216, Molecular Diversity Preservation International (MDPI) Basel, Switzerland, ISSN 1420-3049.

(Continued)

*Primary Examiner* — Brieann R Johnston
(74) *Attorney, Agent, or Firm* — Peter Edwards

(57) ABSTRACT

An ultraviolet (UV) light stabilizing polymeric filler material includes a particle that is surface modified to include a hydroxyphenyl-benzotriazole (HPB) derivative functionality.

18 Claims, 14 Drawing Sheets

(56) References Cited

U.S. PATENT DOCUMENTS

| | | | | |
|---|---|---|---|---|
| 2004/0204521 | A1* | 10/2004 | Camenzind | B82Y 30/00 |
| | | | | 524/90 |
| 2008/0058459 | A1* | 3/2008 | Brand | C08K 9/04 |
| | | | | 524/493 |
| 2009/0291107 | A1* | 11/2009 | Schehlmann | A61K 8/29 |
| | | | | 424/401 |
| 2010/0184887 | A1* | 7/2010 | Gonzalez | A61K 8/27 |
| | | | | 524/99 |

OTHER PUBLICATIONS

Xanthopoulos, *UV Stabilizers for Engineering Plastics: UV Stabilizers for Polycarbonate (PC)*, The Universal Selection Source: Plastics & Elastomers, accessed Aug. 3, 2017, 4 pages, Omnexus by SpecialChem (online), <https://omnexus.specialchem.com/selection-guide/uv-stabilizers-for-engineering-plastics/uv-stabilizers-for-polycarbonate>.

Stöber et al., *Controlled Growth of Monodisperse Silica Spheres in the Micron Size Range*, Journal of Colloid and Interface Science, vol. 26, Issue 1, Jan. 1968, pp. 62-69, Leibniz Institute for Polymer Research Dresden e. V., Germany.

Perro et al., "Production of large quantities of "Janus" nanoparticles using wax-in-water emulsions," Elsevier, Colloids and Surfaces A: Physicochemical and Engineering Aspects, vol. 332, Issue 1, Jan. 5, 2009, pp. 57-62, https://doi.org/10.1016/j.colsurfa.2008.08.027.

* cited by examiner

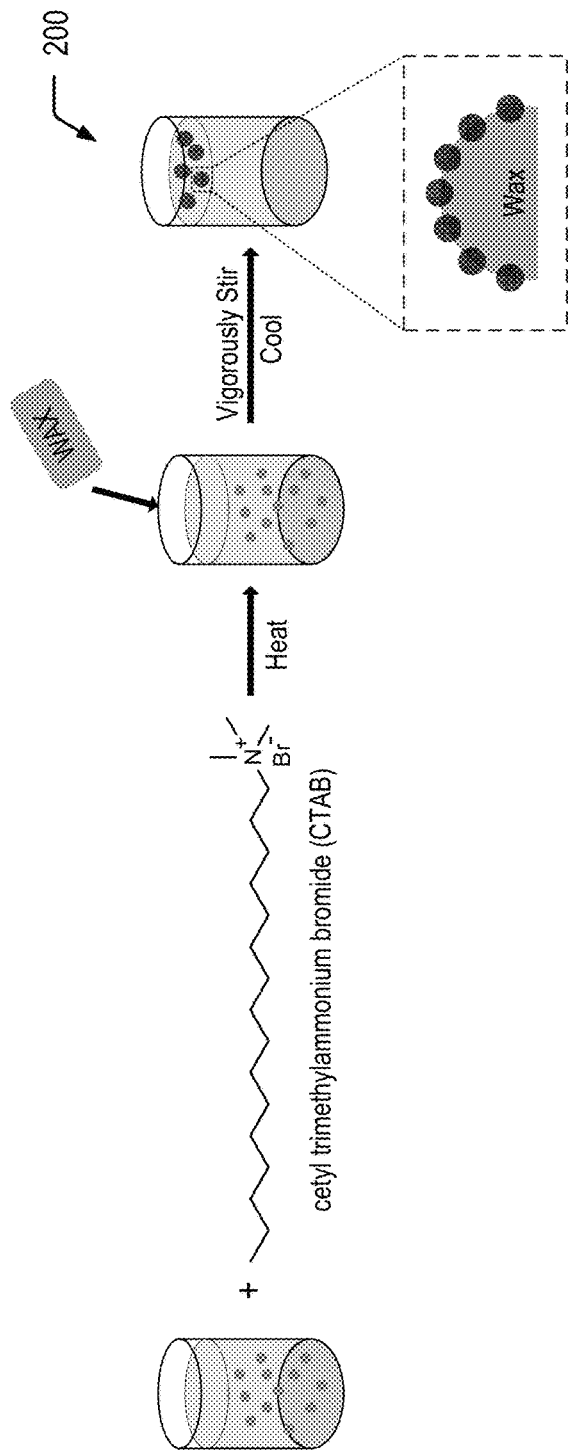
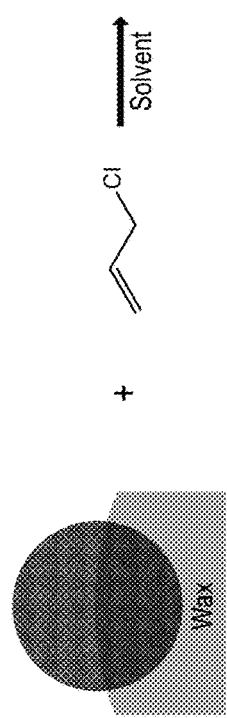
FIG. 2A
FIG. 2B

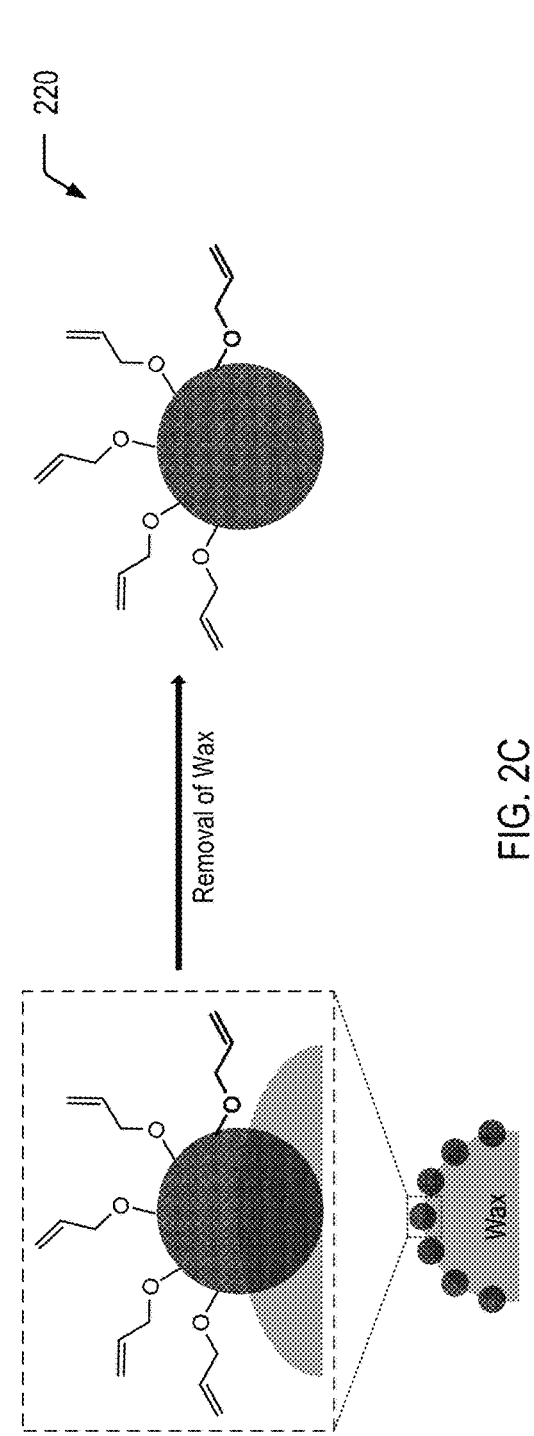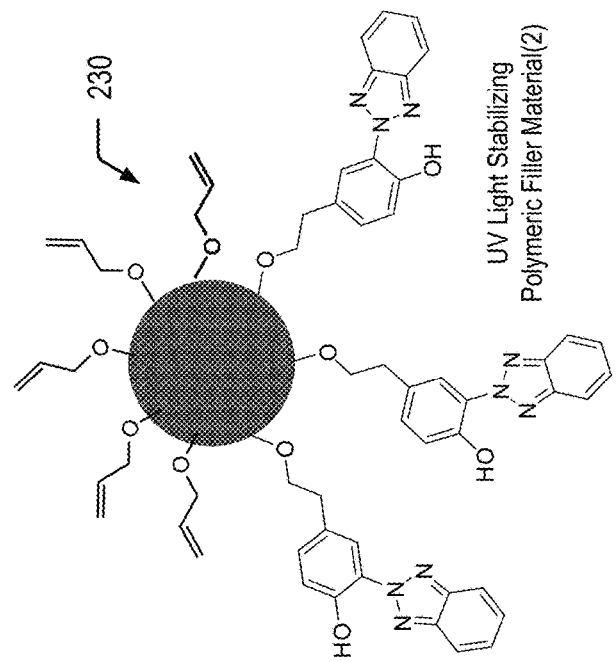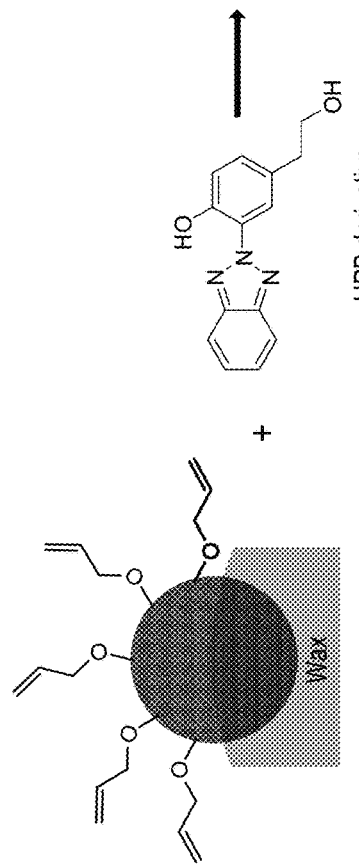
FIG. 2C
FIG. 2D

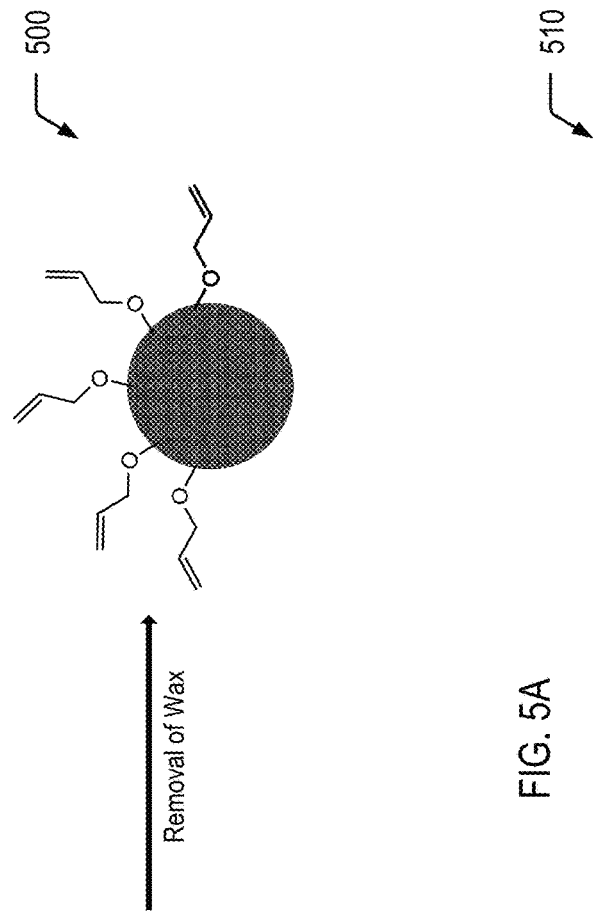
FIG. 5A
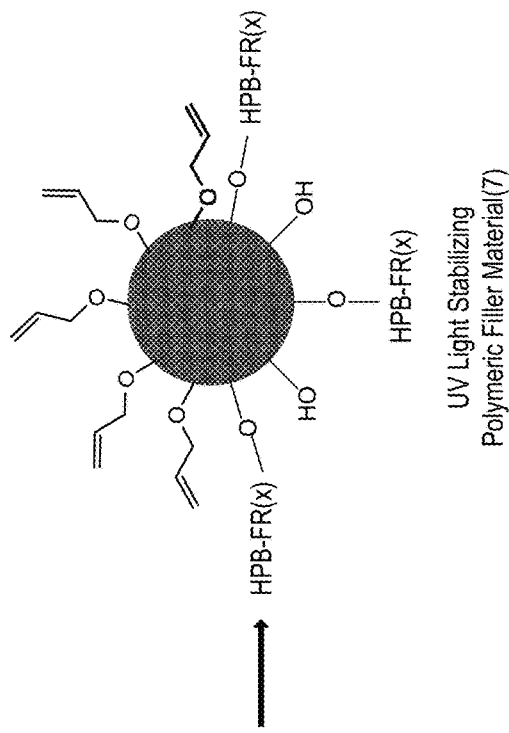
FIG. 5B
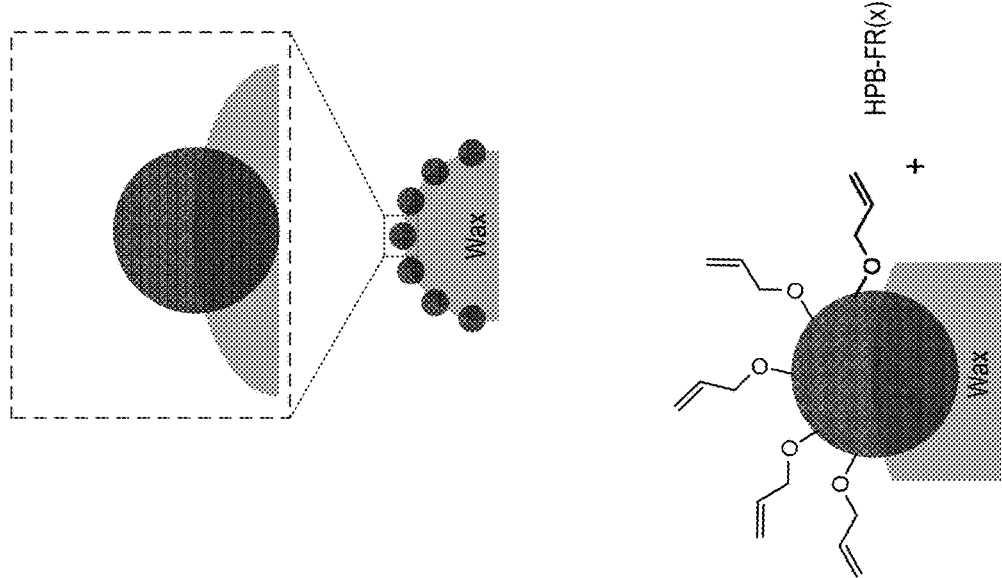

ULTRAVIOLET LIGHT STABILIZING POLYMERIC FILLER MATERIALS

BACKGROUND

Ultraviolet (UV) light stabilizers may be useful to protect adhesives, plastics, coatings, and elastomers from damaging effects of outdoor weathering that may result from exposure to UV light. For example, polycarbonate (PC) is a versatile and widely used thermoplastic polymer. However, exposure of a PC material to UV light may lead to surface degradation, which in turn affects various properties of the polymer including impact strength and clarity. Therefore, in applications with UV light exposure, a UV stabilizer may be required. Examples of UV light stabilizers include hydroxyphenyl-benzotriazole (HPB) molecules and hindered amine light stabilizer (HALS) molecules. However, HALS molecules may be inappropriate for PC materials, as these basic amine compounds may accelerate PC hydrolysis.

SUMMARY

According to an embodiment, a UV light stabilizing polymeric filler material is disclosed. The UV light stabilizing polymeric filler material includes a particle that is surface modified to include a hydroxyphenyl-benzotriazole (HPB) derivative functionality.

According to another embodiment, a process of forming a UV light stabilizing polymeric filler material is disclosed. The process includes surface modifying a silica particle to include an HPB derivative functionality.

According to yet another embodiment, an article of manufacture is disclosed. The article of manufacture includes a polymeric material and a UV light stabilizing polymeric filler material. The UV light stabilizing polymeric filler material includes a silica particle that is surface modified to include an HPB derivative functionality.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 2A-2D illustrate an example of a process of forming a UV light stabilizing polymeric filler material that includes a particle having a first portion that is surface modified to include an HPB derivative functionality and second portion that is surface modified to include a matrix bonding functionality, according to one embodiment.

FIGS. 5A-5B illustrate examples of a process of forming a UV light stabilizing polymeric filler material that includes a particle having a first portion that is surface modified to include an HPB derivative functionality with a phosphorus-based flame retardant moiety and a second portion that is surface modified to include a matrix bonding functionality, according to one embodiment.

DETAILED DESCRIPTION

Figure 1A:
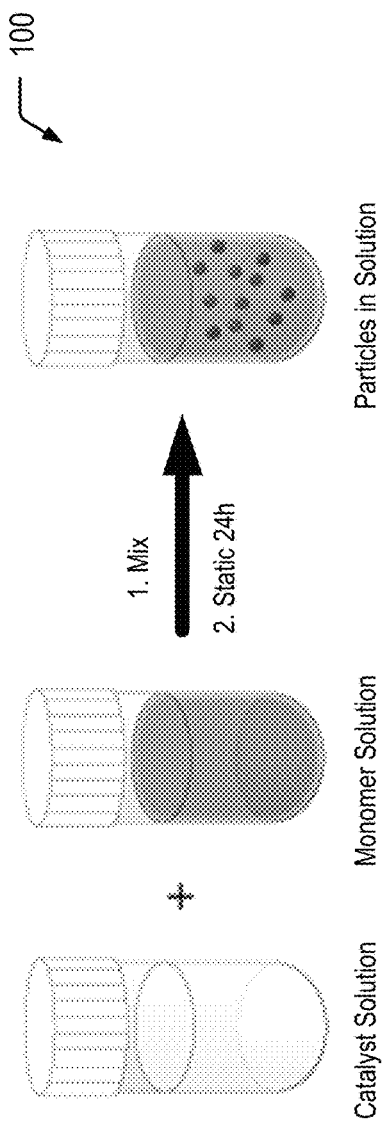
FIGS. 1A-1B illustrate an example of a process of forming a UV light stabilizing polymeric filler material that includes a particle that is surface modified to include an HPB derivative functionality, according to one embodiment.

The present disclosure describes UV light stabilizing polymeric filler materials and processes for forming UV light stabilizing polymeric filler materials. The UV light stabilizing polymeric filler materials of the present disclosure include particles (e.g., silica particles) that are surface modified to include at least a hydroxyphenyl-benzotriazole (HPB) derivative functionality. When the surface modified particles are added to a polymeric material (e.g., a polycarbonate material) as a polymeric filler material, the HPB derivative functionality imparts UV light stabilization to the polymeric material to protect from surface degradation associated with exposure to UV light. In some cases, the particles may be surface modified to bind additional functionality to the particles. For example, in addition to the HPB derivative functionality, the particles may be surface modified to include a matrix bonding functionality, a phosphorus-based flame retardant moiety, or a combination thereof. The matrix bonding functionality (e.g., vinyl, amine, epoxy, allyl, or acrylate groups) may enable the particles to be bound into an appropriate polymeric matrix material. The phosphorus-based flame retardant moiety may impart flame retardancy characteristics to the polymeric material.

In some embodiments of the present disclosure, the surface-modified particles may correspond to "two-faced" particles (also referred to as "Janus" particles) having a first portion of a particle surface modified with a first set of functional groups and a second portion of the particle surface modified with a second set of functional groups. As described further herein, such "dual-functionalized" particles may be formed using a wax emulsion technique that enables binding of the first set of functional groups to a partially exposed particle surface followed by binding of the second set of functional groups to the other portion of the particle surface after removal of the wax encapsulant. As an example, a dual-functionalized particle of the present disclosure may include a particle having a first portion that is surface modified to include the HPB derivative functionality (that may optionally include a phosphorus-containing moiety) and a second portion that is surface modified to include a matrix bonding functionality. As another example, a dual-functionalized particle of the present disclosure may include a particle having a first portion that is surface modified to include the HPB derivative functionality and a second portion that is surface modified to include a phosphorus-based flame retardant (FR) moiety.

By incorporating an HPB derivative functionality and optionally additional functionality (such as matrix bonding functionality and/or flame retardant functionality) into a single particle, the UV light stabilizing silica particles of the present disclosure may replace multiple separate additives. Replacing multiple separate additives may result in advantages associated with process simplification, cost savings (that may be associated with reduced processing time), or a combination thereof.

Figure 1B:
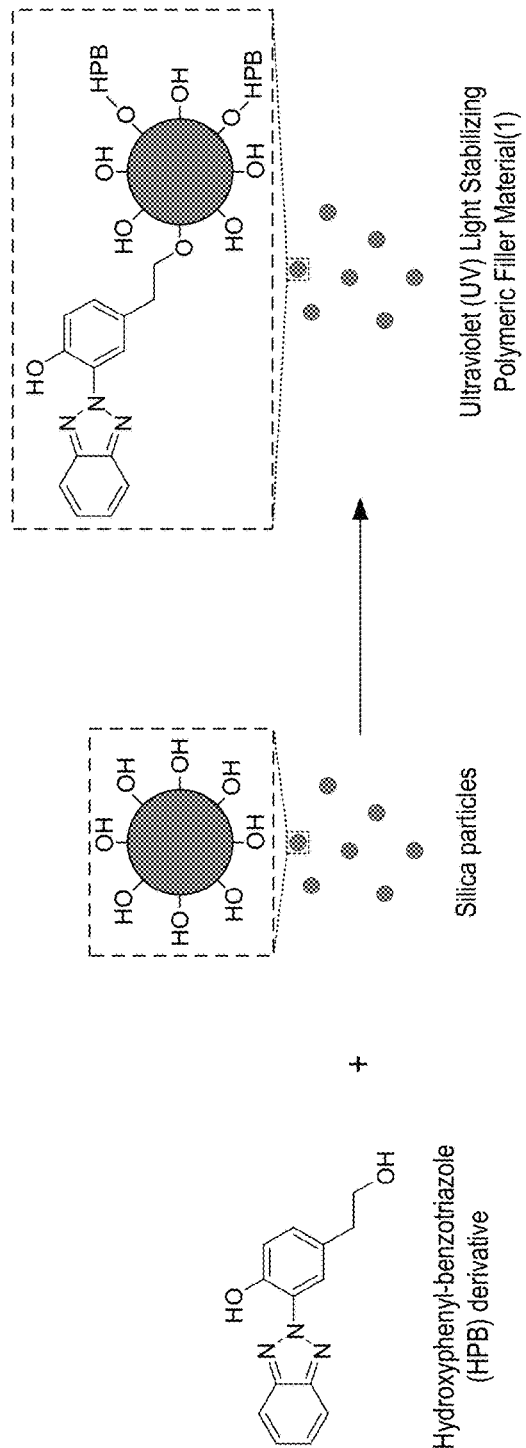

FIGS. 1A-1B illustrate an example of a process of forming a UV light stabilizing polymeric filler material that includes a particle that is surface modified to include an HPB derivative functionality, according to one embodiment. FIG. 1A is a diagram 100 illustrating the formation of an oxide particle (e.g., a silica particle) for subsequent surface modification. FIG. 1B is a diagram 110 illustrating a first example of a process of surface modification of the particle of FIG. 1A to include an HPB derivative functionality. The resulting surface-modified particle depicted on the right side of FIG. 1B represents a first example of a "mono-functionalized" particle, in which the HPB derivative functionality imparts UV light stabilization characteristics to the particle.

Referring to FIG. 1A, the particle may include a silica particle that is prepared through a modified Stober et al. synthesis (among other alternative processes). Utilizing a silica precursor (e.g., tetraethoxysilane (TEOS)), ammonia, water, and a solvent may enable production of particles that have diameters in the nanometer size range up to the micron size range. By varying the water concentration in the synthesis, the particle's diameter can be varied. After synthesis, particles may be removed from their mother liquor solution to halt the growth of the particles and to obtain the desired particle size. Through the process of centrifugation and solvent washes, particles may be removed from residual catalyst and precursor monomer. Particles may then be removed from solution in vacuo for further processing. In a particular embodiment, the resulting silica particles may correspond to silica "nanoparticles" having a characteristic dimension (e.g., an average diameter of a substantially spherical silica particle) in a range of 1 nm to 1 μm.

As a prophetic example, silica nanoparticles may be prepared through a modified Stober et al. synthesis using anhydrous ethanol (200 proof), ammonia (2M), deionized water, and tetraethoxysilane (TEOS). TEOS may be distilled prior to use. Ethanol (5.38 mL) and TEOS (0.38 mL) may be added to a 20 mL scintillation vial and shaken to mix. In a separate vial, 2M ammonia (3.75 mL) and deionized water (0.49 mL) may be added and shaken to mix. The ammonia solution may then be poured into the ethanol/TEOS solution and left to stir for about 24 hours. After a suitable reaction period, particles may be centrifuged and rinsed with ethanol multiple times (e.g., at least 3 times) to remove residual monomer, yielding silica nanoparticles. The final molar ratio of TEOS:ammonia:water may be 1.00:4.39:15.95. The silica nanoparticles may have a characteristic dimension (e.g., an average diameter) of about 200 nanometers.

Referring to FIG. 1B, starting with the silica particles formed according to the process described with respect to FIG. 1A, the particles may be re-dispersed in a solvent, and a hydroxyphenyl-benzotriazole (HPB) derivative may be added and the solution stirred for a few hours. The process of reacting an alkyl/aryl hydroxyl moiety with the silica particles of FIG. 1A may utilize a tin catalyst, such as tin (II) octanoate. In the particular embodiment depicted in FIG. 1B, 3-(2H-benzotriazol-2-yl)-4-hydroxy-benzeneethanol represents an illustrative, non-limiting example of an HPB derivative that may be chemically reacted with the silica particles of FIG. 1A. One of ordinary skill in the art will appreciate that alternative HPB derivatives may also be utilized, such as 3-(2H-benzotriazol-2-yl)-4-hydroxy-benzenemethanol or 3-(2H-benzotriazol-2-yl-)-5-(1,1-dimethylethyl)-4-hydroxy-benzenepropanol. After stirring the solution for a few hours, the particles may be centrifuged, washed, and dried to yield UV light stabilizing nanoparticles. The resulting particles are identified as "UV Light Stabilizing Polymeric Filler Material(1)" in FIG. 1B, with a callout view illustrating one of the surface-modified silica nanoparticles in detail.

Examples of alternative HPB derivatives that may be reacted with the silica particles of FIG. 1A may include: 4-(2H-benzotriazole-2-yl)1,3-dihydroxybenzene; 2,4-[Di(2H-benzotriazole-2-yl)]1,3-dihydroxybenzene; 2,4-[Di(2H-benzotriazole-2-yl)]1,3,5-trihydroxybenzene; and 2,4,6-[Tri(2H-benzotriazole-2-yl)]1,3,5-trihydroxybenzene. In such cases, the process of reacting the hydroxyl moiety with the silica particles of FIG. 1A may utilize and organic acid catalyst, such as methane sulfonic acid, ceric sulfate tetrahydrate, or diethyl azodicarboxylate (DEAD), among other alternatives.

Thus, FIGS. 1A-1B illustrate an example of a process of forming a UV light stabilizing polymeric filler material that includes a particle that is surface modified to include an HPB derivative functionality. The surface-modified particle depicted in FIG. 1B represents an example of a mono-functionalized particle of the present disclosure, in which the HPB derivative functionality imparts UV light stabilization characteristics to the particle. The UV light stabilizing polymeric filler material of FIG. 1B represents an example of a single polymeric additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the UV light stabilizing polymeric filler material of FIG. 1B may be satisfactory to prevent UV degradation in polycarbonate materials.

FIGS. 2A-2D illustrate an example of a process of forming a UV light stabilizing polymeric filler material that includes a particle having a first portion that is surface modified to include an HPB derivative functionality and a second portion that is surface modified to include a matrix bonding functionality, according to one embodiment. FIG. 2A is a diagram 200 illustrating particle preparation prior to surface modification. FIG. 2B is a diagram 210 illustrating an example of surface modification of the first portion of the particle with a matrix bonding functionality (e.g., allyl groups, among other alternatives). FIG. 2C is a diagram 220 illustrating wax removal to expose the second portion of the particle, and FIG. 2D is a diagram 230 illustrating subsequent surface modification of the second portion of the particle to include an HPB derivative functionality. The surface-modified particle depicted in FIG. 2D represents a first example of a "dual-functionalized" particle of the present disclosure, in which one portion of the particle is surface-modified to include the HPB derivative functionality and another portion of the particle is surface-modified to include another functionality (e.g., matrix bonding functionality). The HPB derivative functionality imparts UV light stabilization characteristics to the particle, and the matrix bonding functionality enables the particle to be bound into a corresponding polymeric matrix.

FIG. 2A illustrates that the particles (that may be produced according to the process previously described herein with respect to FIG. 1A) are first modified to protect a portion of a surface of the particle. In a particular embodiment, such "Janus" particles may be produced using a wax emulsion technique (e.g., using a paraffin wax). In FIG. 2B, a first portion of the particle is exposed while a second portion of the particle is encapsulated (e.g., in paraffin wax). As illustrated and further described herein with respect to FIG. 2C, after a first set of functional groups (e.g., matrix bonding functional groups) have been attached to the first portion of the particle, the wax encapsulant may be removed to expose the second portion of the particle. As illustrated and further described herein with respect to FIG. 2D, a second set of functional groups (e.g., the HPB derivative functionality) may be attached to the second portion of the particle to form a UV light stabilizing polymeric filler material.

In the example of FIG. 2B, the first set of functional groups to be attached to the particle include matrix/resin bonding functional groups (e.g., allyl groups). As illustrated and further described herein with respect to the examples of FIGS. 2C and 2D, the second set of functional groups to be attached to the particle include UV light stabilizing functional groups. In other cases, the first set of functional groups to be attached to the particle may include the UV light stabilizing functional groups, and the second set of functional groups to be attached to the particle may include the matrix bonding functional groups. Additionally, while FIG. 2B illustrates an example of the addition of allyl functional groups to a silica particle, one of ordinary skill in the art will appreciate that alternative functional groups and/or particles may be utilized. Illustrative, non-limiting examples of alternative matrix bonding moieties may include thiols, amines, epoxies, succinimides, or acrylates that may be selected for a particular polymeric resin type that the multiple-function filler material is to be bonded to (e.g., prior to an injection molding operation).

With respect to FIG. 2A, in preparation of "two faced" particles, an emulsion is fabricated. Primary silica particles (produced according to the process described herein with respect to FIG. 1A) are dispersed in an ethanol/water solution at an elevated temperature (to melt the wax that will be added later) and then mixed. The particle mixture is then mixed with cetyl trimethylammonium bromide (CTAB) to partially hydrophobize the surface of the particle. A low concentration of CTAB is used to avoid the creation of a bilayer at the surface of the particle. The CTAB also allows for the particle to favor the adsorption at the oil-water interface. Paraffin wax is then deposited on top of the particle suspension, and the mixture is vigorously stirred at the elevated temperature. After cooling to room temperature, the paraffin wax solidifies into solid droplets with the particles partially extruding from the surface. The particles are then washed with an acid to remove CTAB and expose a bare particle surface.

With respect to FIG. 2B, functionalization may be done by reacting allyl chloride with the exposed particle surface. To proceed with the surface modification of the particle, the colloidosomes are reacted in their original emulsions with an allyl chloride solution. This functionalizes the particle's surface yielding particles having matrix bonding chemistries. Other functionalities for bonding to the matrix outside of the described vinyl could be, but are not limited to, thiols, amines, epoxies, acyrlates, and succinimides.

With respect to FIGS. 2A-2C, as a prophetic example, Janus particles with matrix bonding functionality may be prepared using a modified Perro et al. paraffin-in-water emulsion. Silica particles are dispersed in an ethanol/water (6.7%, w/w) solution and heated to 65° C. To the suspension, cetyl trimethylammonium bromide (CTAB; $C_{CTAB}/S_{Silica}=5\times10^{-6}$ mol L$^{-1}$ m$^2$-S$_{Silica}$). To the suspension, paraffin wax (1 g, Merck, CAS no. 8002-74-2) is deposited on top of the suspension. Once the wax has melted, the mixture is vigorously stirred (9000 rpm) for 80 s. The emulsion is then allowed to cool to room temperature, affording solid droplets of paraffin wax with embedded silica particles. The solid paraffin wax droplets are then filtered and dispersed into toluene (20 mL) and stirred. Next, allyl chloride (0.1-10 wt %) is added and the mixture is heated to 35° C. The mixture is allowed to react for 48 h followed by filtration and washing of the wax droplets with ethanol. Finally, the paraffin droplets are dissolved in dichloromethane (DCM) to afford vinyl-modified "Janus" silica particles (shown on the right side of FIG. 2C).

With respect to FIG. 2D, in order to attach the UV light stabilizer to the particle, the following procedure can be utilized. This functionalization may be performed by reacting an HPB derivative (e.g., 3-(2H-benzotriazol-2-yl)-4-hydroxy-benzeneethanol in the example of FIG. 2D) with the exposed "free" particle surface. To proceed with the surface modification of the particle, the previously modified particles of FIG. 2C are reacted with a 3-(2H-benzotriazol-2-yl)-4-hydroxy-benzeneethanol solution. The process of reacting an alkyl/aryl hydroxyl moiety with the silica particles of FIG. 2C may utilize a tin catalyst, such as tin (II) octanoate. As previously described herein, for some alternative HPB derivatives, the process of reacting the hydroxyl moiety with the silica particles of FIG. 2C may utilize an organic acid catalyst. This functionalizes the particle's surface leaving the matrix bonding functionality available for reaction to the matrix. An example of one of the resulting dual-functionalized particles is identified as "UV Light Stabilizing Polymeric Filler Material(2)" in FIG. 2D.

Thus, FIGS. 2A-2D illustrate an example of a process of forming a UV light stabilizing polymeric filler material that includes a particle that is surface-modified to include functionality in addition to the UV light stabilizing functionality. The surface-modified particle depicted in FIG. 2D represents an example of a dual-functionalized particle, in which one portion of the particle is surface-modified to include the HPB derivative functionality and another portion of the particle is surface-modified to include another functionality (e.g., matrix bonding functional groups). The HPB derivative functionality imparts UV light stabilization characteristics to the particle, and the matrix bonding functional groups enable the particle to be bound into a corresponding polymeric matrix. The dual-functionalized particle of FIG. 2D represents an example of a single additive that may replace multiple separate additives, resulting in advantages associated with process simplification, cost savings, or a combination thereof (among other possible advantages).

Figure 3A:
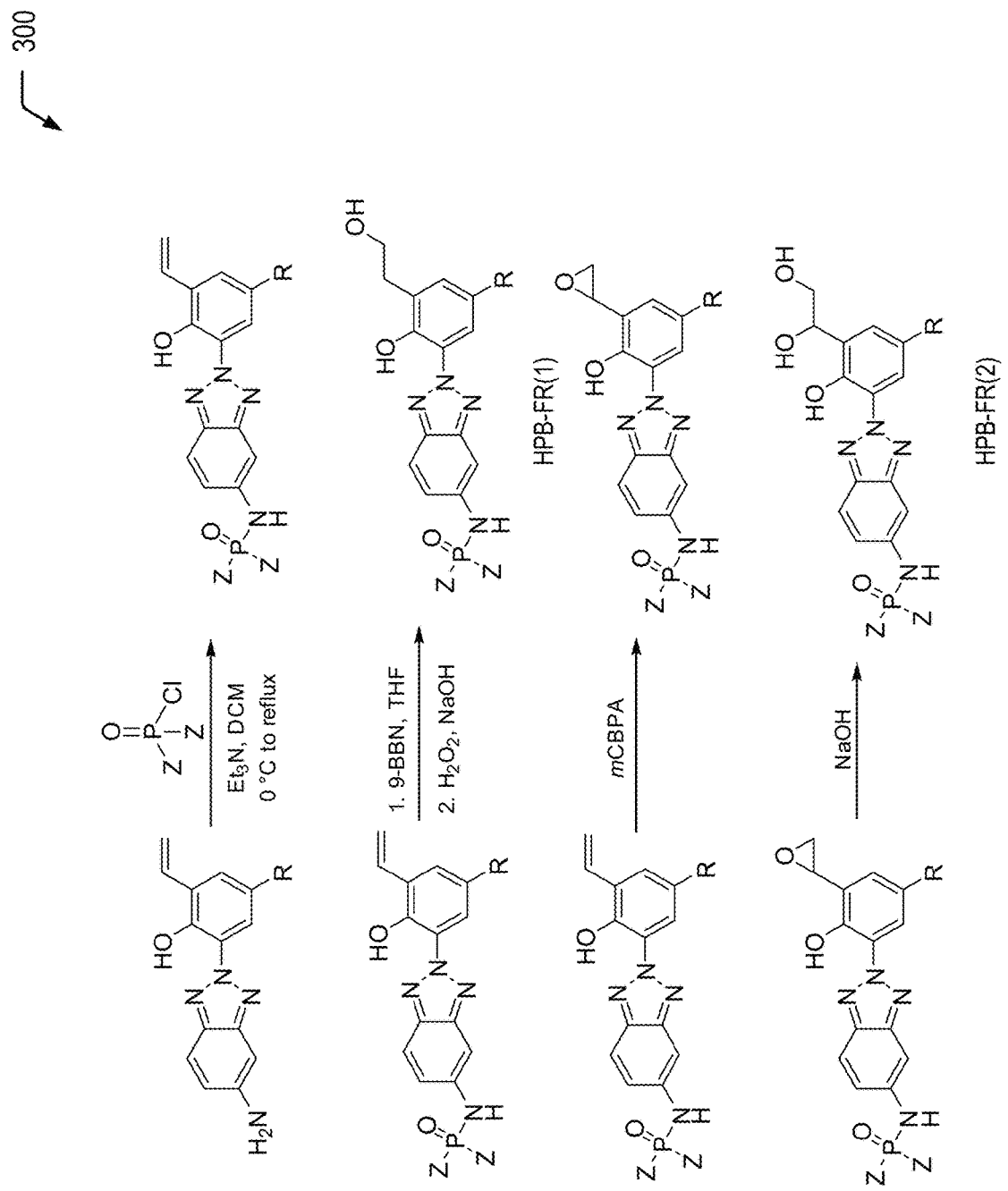
FIGS. 3A-3C illustrate an example of a process of forming a UV light stabilizing polymeric filler material that includes a particle that is surface modified to include an HPB derivative functionality that includes a phosphorus-based flame retardant moiety, according to one embodiment.
Figure 3B:
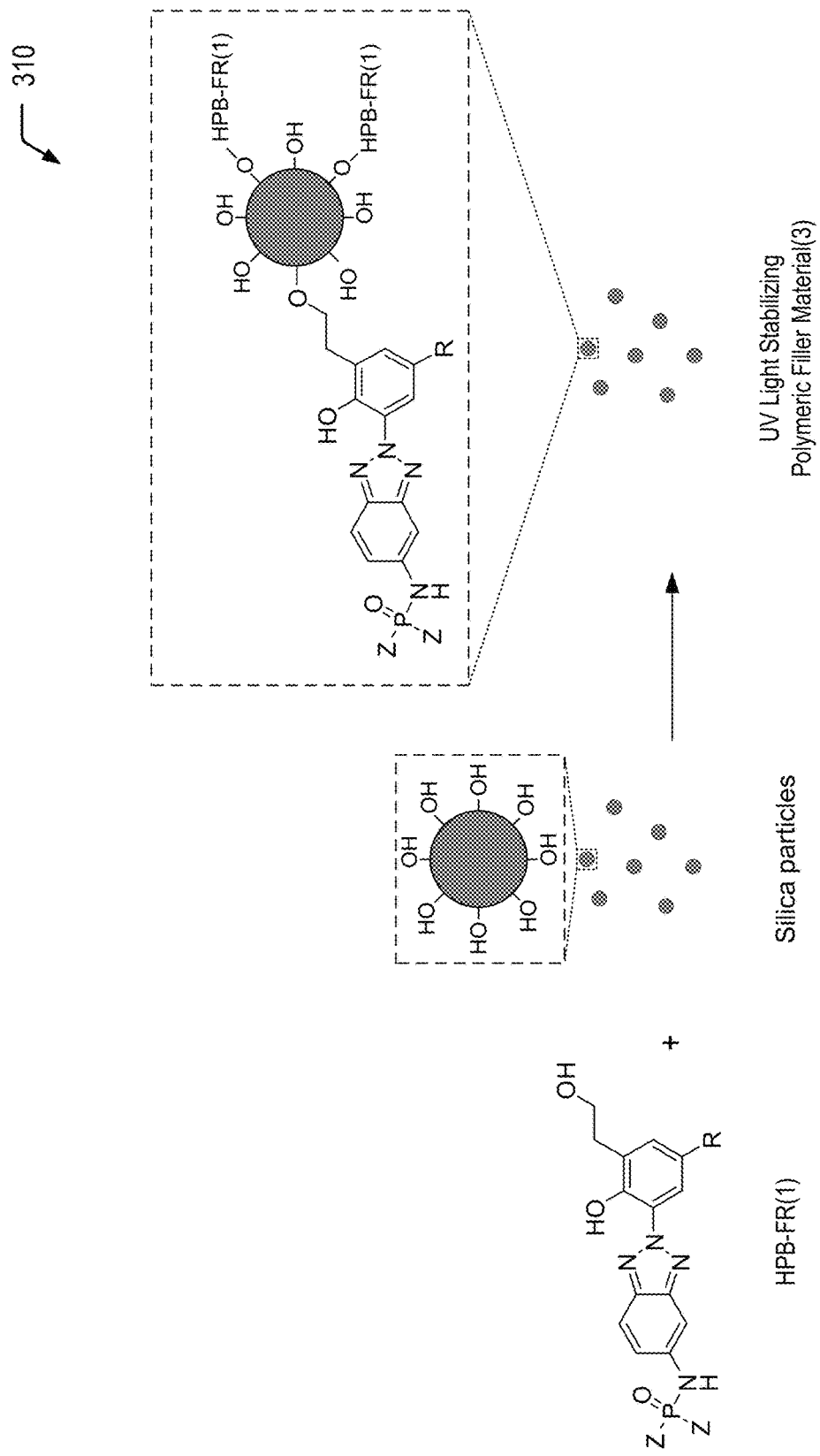
Figure 3C:
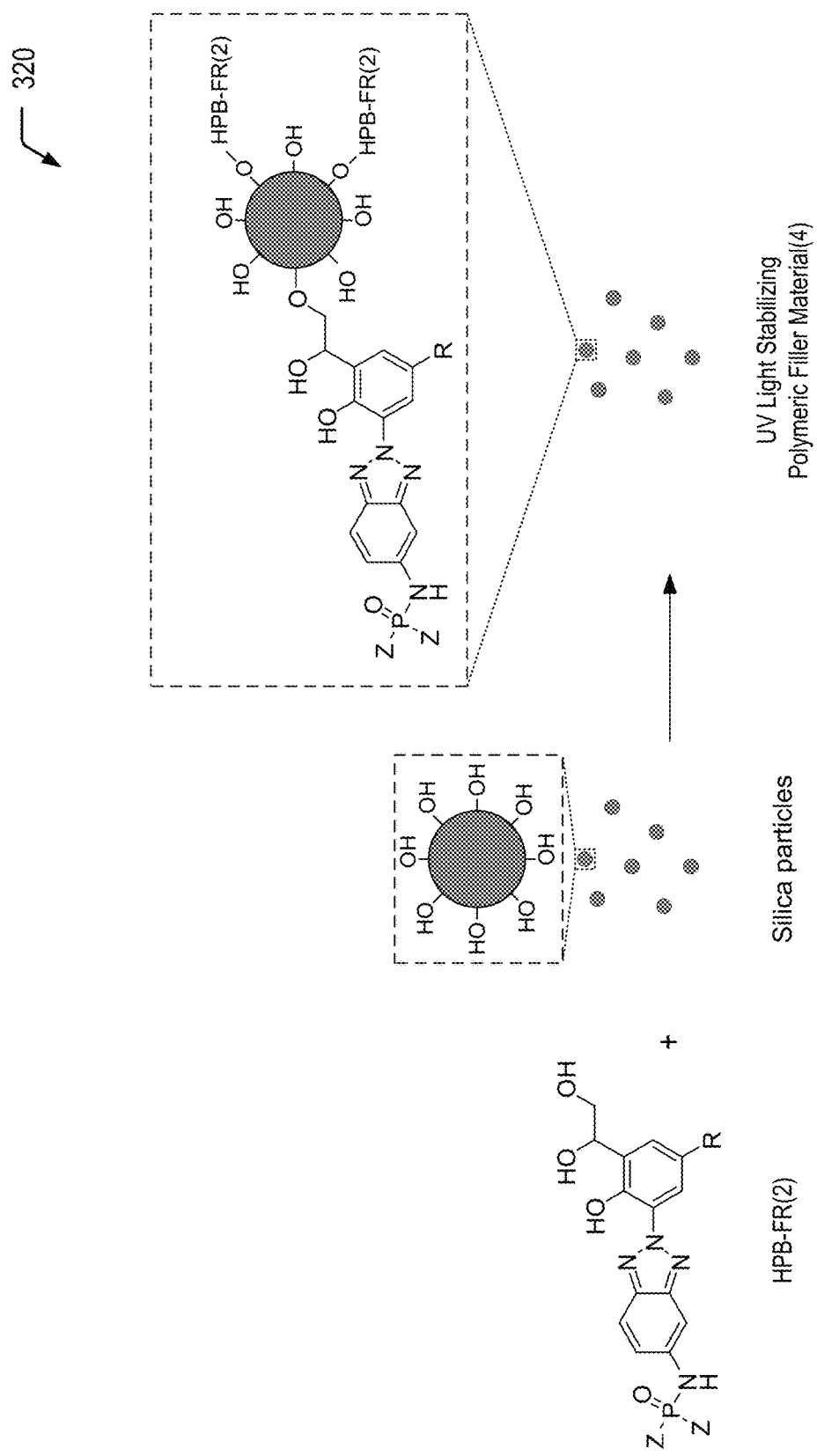

FIGS. 3A-3C illustrate an example of a process of forming a UV light stabilizing polymeric filler material that includes a particle that is surface modified to include an HPB derivative functionality that includes a phosphorus-based flame retardant moiety, according to one embodiment. FIG. 3A is a chemical reaction diagram 300 illustrating methods of forming a first example of an HPB derivative molecule that includes a phosphorus-based flame retardant moiety (identified as "HPB-FR(1)") and a second example of an HPB derivative molecule that includes a phosphorus-based flame retardant moiety (identified as "HPB-FR(2)"). FIG. 3B is a diagram 310 illustrating the surface modification of the silica particles (of FIG. 1A) with the HPB-FR(1) molecule of FIG. 3A, and FIG. 3C is a diagram 320 illustrating the surface modification of the silica particles (of FIG. 1A) with the HPB-FR(2) molecule of FIG. 3A. The surface-modified particles depicted in FIGS. 3B and 3C represent examples of mono-functionalized particles, in which surface modification with the HPB-FR molecule imparts UV light stabilization characteristics as well as flame retardancy characteristics to the particle.

Referring to FIG. 3A, the first chemical reaction (from top to bottom) illustrates the addition of a phosphorus-containing moiety to an HPB derivative molecule. In the example of FIG. 3A, the HPB derivative molecule has the following chemical structure:

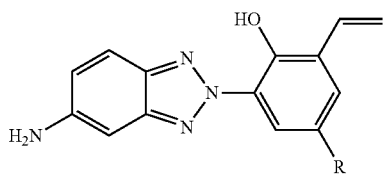

In the above chemical structure, R represents an alkyl group or an aryl group, such as a methyl group or a phenyl group. To illustrate, in the case of a methyl group, the HPB derivative molecule corresponds to a 2-(5-Amino-2H-benzotriazol-2-yl)-6-ethenyl-4-methylphenol molecule.

As a prophetic example, the HPB derivative molecule may be formed according to the following synthetic procedure. A solution of 0.01 2-amino-4-methyl-6-vinylphenolin 15 mL of water and 2 mL of concentrated hydrochloric acid may be diazotized at 0 to 5° C. in the presence of 0.04 g of copper(II) sulfate pentahydrate with a solution of sodium nitrite (1 equiv.) in 5 mL of water. The cold solution (5° C.) of diazonium chloride may be added dropwise to a solution (5° C.) of m-phenylenediamine (1.08 g, 0.01 mol) in 20 mL of water and 1 mL of concentrated hydrochloric acid over a period of 20 min. To this mixture, a solution of sodium acetate (10 mL, 40%) may be added over a period of 0.5 h with stirring at 5° C. After 2 h of stirring at room temperature, the reaction mixture may be treated with 5 mL of 25% aqueous ammonium hydroxide solution (to pH=8), and the precipitate azo compound may be isolated by filtration and washed four times with water. Then the azo compound may be dissolved in 2-methoxyethanol (50 mL). Copper(II) sulfate pentahydrate (6.0 g) in 15 mL of water and 24 mL of 25% aqueous ammonium hydroxide solution may be added with stirring to the solution of the azo compound. After 2 h at 98° C., the reaction mixture may be cooled to room temperature. The suspension may be filtered and the residue stirred with 20 mL of 5 N hydrochloric acid for 1 h. To the resulting acid mixture, 10 mL of water and 6 mL of 25% aqueous ammonium hydroxide solution may be added (to pH=8). The crude precipitated product may be isolated by filtration, washed with water and dried. Three-fold crystallization from butyl acetate may afford the substituted 5-aminobenzotriazole.

The first chemical reaction of FIG. 3A illustrates that the HPB derivative molecule may be chemically reacted with a phosphorus-containing molecule (e.g., diphenylphosphoryl chloride, where Z=Ph) to bind a phosphorus-containing moiety to the starting material. The right side of the first chemical reaction depicted in FIG. 3A illustrates the formation of an intermediate molecule having the following chemical structure:

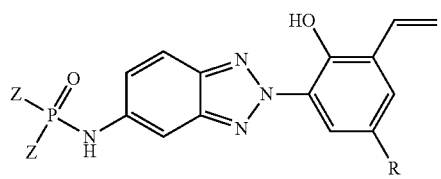

In the above chemical structure, Z represents an alkyl group, an aryl group, an alkoxy group, or an aryloxy group (e.g., a phenyl group when the phosphorus-containing molecule corresponds to diphenylphosphoryl chloride). As a prophetic example, the addition reaction may include chemically reacting the HPB derivative molecule with the phosphorus-containing molecule. As a prophetic example, triethylamine (1.2 equiv.) and N,N-dimethylaminopyridine (DMAP) (3.0 mol %) may be added to a stirred solution of the HPB derivative molecule (1.0 equiv.) in 150 mL of DCM, under argon, and cooled to 0° C. A solution of the phosphorus-containing molecule in DCM (1.1 equiv.) may be added dropwise at 0° C. Upon completion of the addition, the reaction mixture may be allowed to stir for 1 hour at 0° C. and may be warmed to room temperature or reflux and stirred for 16 hours. The reaction mixture may be subsequently washed twice with water, followed by 1N HCl, three additional washes of water, and brine. The organic layer may be dried over anhydrous sodium sulfate, filtered, and the solvents removed in vacuo. The product may be purified by fractional distillation.

The subsequent chemical reactions depicted in FIG. 3A illustrate the formation of alternative HPB-FR molecules from the intermediate molecule. Specifically, the second chemical reaction of FIG. 3A illustrates a method of utilizing the intermediate molecule to form the HPB-FR(1) molecule having the following chemical structure:

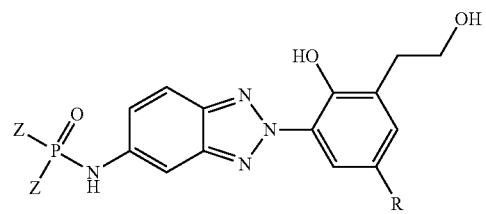

As a prophetic example, the intermediate molecule may first be chemically reacted with 9-BBN in a solution of tetrahydrofuran (THF), followed by a reaction in an $H_2O_2$/NaOH solution.

The third and fourth chemical reactions depicted in FIG. 3A illustrate a method of forming the HPB-FR(2) molecule having the following chemical structure:

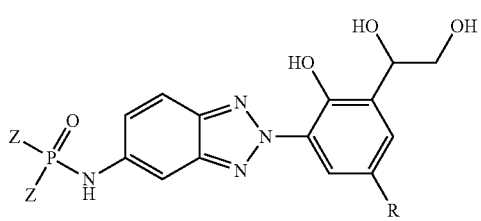

In forming the HPB-FR(2) molecule, the third chemical reaction of FIG. 3A illustrates that the vinyl group of the intermediate molecule is converted to an epoxide group to form a second intermediate molecule having the following chemical structure:

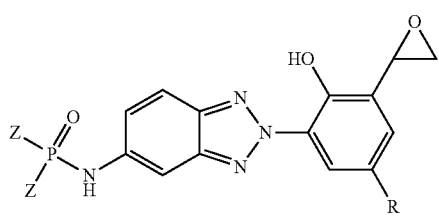

The fourth chemical reaction of FIG. 3A illustrates utilizing the second intermediate molecule to the HPB-FR(2) molecule. As a prophetic example, in the third chemical reaction of FIG. 3A, mCPBA may be utilized to convert the vinyl group to the epoxide group, followed by NaOH in the fourth chemical reaction of FIG. 3A to form the two hydroxyl groups of the HPB-FR(2) molecule.

Referring to FIG. 3B, starting with the silica particles formed according to the process described with respect to FIG. 1A, the particles may be re-dispersed in a solvent, and the HPB-FR(1) molecule of FIG. 3A may be added and the solution stirred for a few hours. After stirring the solution for a few hours, the particles may be centrifuged, washed, and dried to yield UV light stabilizing, flame retardant nanoparticles. The resulting particles are identified as "UV Light Stabilizing Polymeric Filler Material(3)" in FIG. 3B, with a callout view illustrating one of the surface-modified silica nanoparticles in detail.

Referring to FIG. 3C, starting with the silica particles formed according to the process described with respect to FIG. 1A, the particles may be re-dispersed in a solvent, and the HPB-FR(2) molecule of FIG. 3A may be added and the solution stirred for a few hours. After stirring the solution for a few hours, the particles may be centrifuged, washed, and dried to yield UV light stabilizing, flame retardant nanoparticles. The resulting particles are identified as "UV Light Stabilizing Polymeric Filler Material(4)" in FIG. 3C, with a callout view illustrating one of the surface-modified silica nanoparticles in detail.

Thus, FIGS. 3A-3C illustrate an example of a process of forming a UV light stabilizing polymeric filler material that includes a particle that is surface modified to include an HPB derivative functionality that includes a phosphorus-based flame retardant moiety. The surface-modified particles depicted in FIGS. 3B and 3C represent examples of mono-functionalized particles, in which an HPB derivative that is modified to include a phosphorus-containing moiety is utilized to impart UV light stabilization characteristics as well as flame retardancy characteristics to the particles. The mono-functionalized particles of FIGS. 3B and 3C represent examples of a single additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the UV light stabilizing polymeric filler materials of FIGS. 3B and 3C may be satisfactory to prevent UV degradation in polycarbonate materials (as well as impart flame retardancy characteristics to the PC material).

Figure 4A:
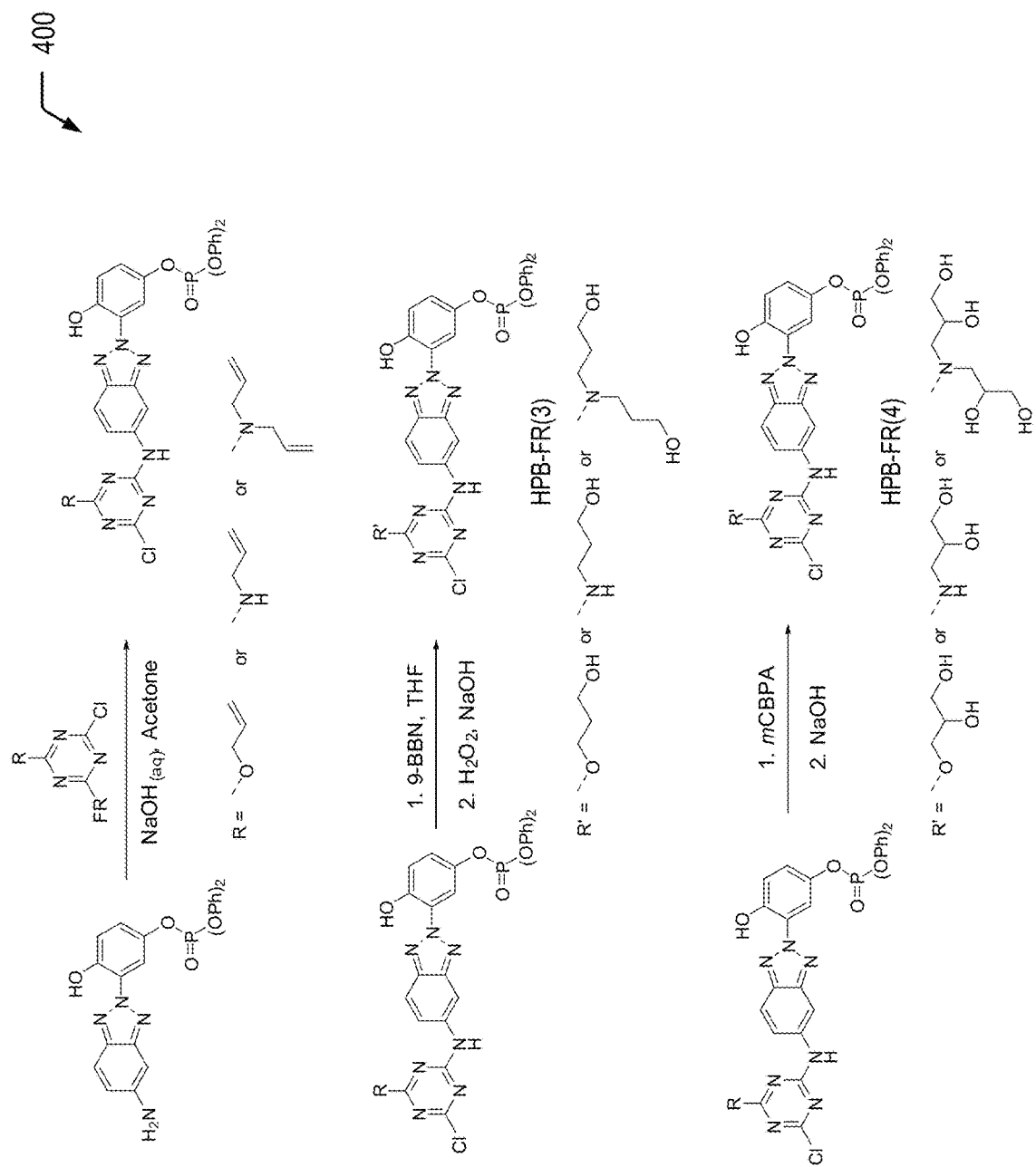
FIGS. 4A-4C illustrate an example of a process of forming a UV light stabilizing polymeric filler material that includes a particle that is surface modified to include an HPB derivative functionality that includes a phosphorus-based flame retardant moiety, according to one embodiment.
Figure 4B:
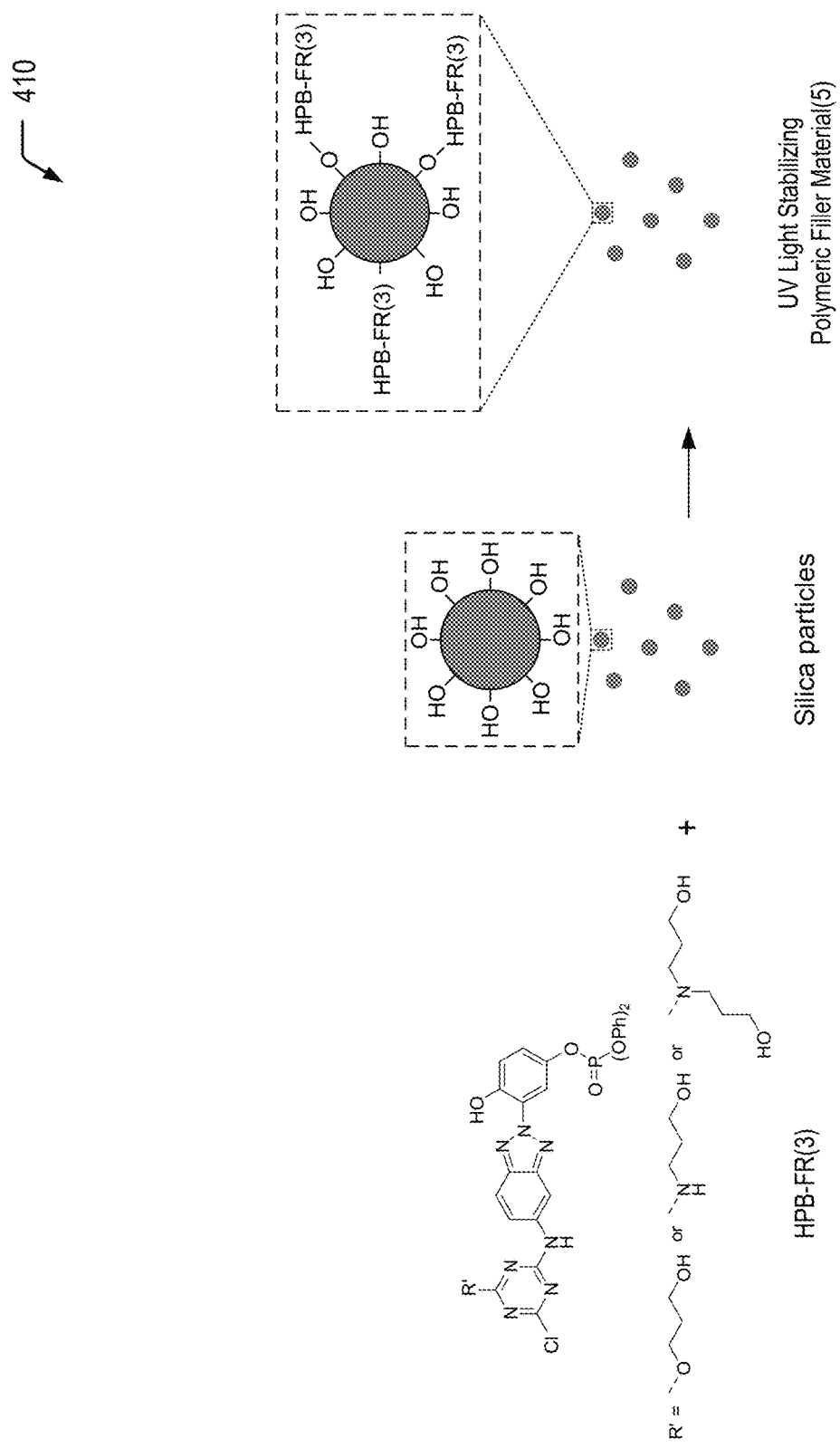
Figure 4C:
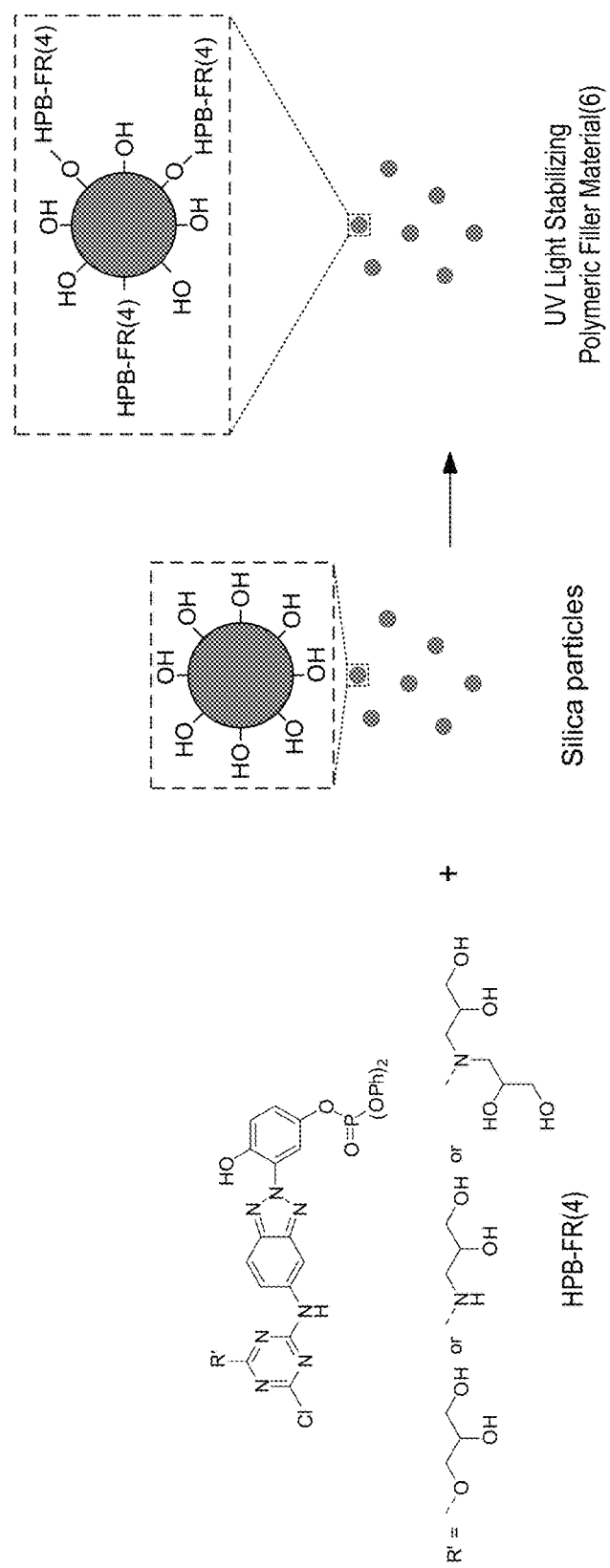

FIGS. 4A-4C illustrate an example of a process of forming a UV light stabilizing polymeric filler material that includes a particle that is surface modified to include an HPB derivative functionality that includes a phosphorus-based flame retardant moiety, according to one embodiment. FIG. 4A is a chemical reaction diagram 400 illustrating methods of forming a third example of an HPB derivative molecule that includes a phosphorus-containing moiety (identified as "HPB-FR(3)") and a fourth example of an HPB derivative molecule that includes a phosphorus-containing moiety (identified as "HPB-FR(4)"). FIG. 4B is a diagram 410 illustrating the surface modification of the silica particles (of FIG. 1A) with the HPB-FR(3) molecule of FIG. 4A, and FIG. 4C is a diagram 420 illustrating the surface modification of the silica particles (of FIG. 1A) with the HPB-FR(4) molecule of FIG. 4A. The surface-modified particles depicted in FIGS. 4B and 4C represent examples of mono-functionalized particles, in which surface modification with an HPB-FR molecule imparts UV light stabilization characteristics as well as flame retardancy characteristics to the particle.

Referring to FIG. 4A, the first chemical reaction (from top to bottom) illustrates modification of a phosphorus-containing HPB derivative molecule having the following chemical structure:

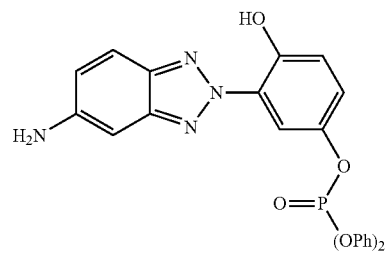

The first chemical reaction of FIG. 4A illustrates that the phosphorus-containing HPB derivative molecule may be chemically reacted with a molecule having the following chemical structure:

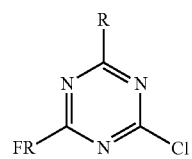

In the above chemical formula, R may include an allyl group (as shown in FIG. 4A), and FR represents an optional phosphorus-containing flame retardant moiety.

As a first example (referred to herein as $R_1$), the molecule may have the following chemical structure:

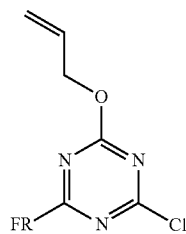

As a second example (referred to herein as $R_2$), the molecule may have the following chemical structure:

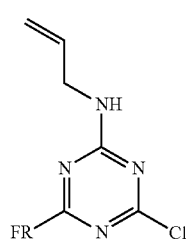

As a third example (referred to herein as $R_3$), the molecule may have the following chemical structure:

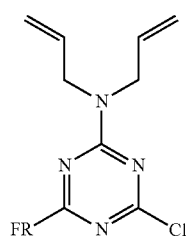

The right side of the first chemical reaction of FIG. 4A illustrates the formation of an intermediate molecule having the following chemical structure:

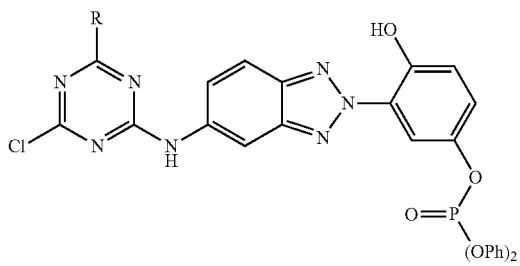

In the case of $R_1$, the intermediate molecule corresponds to the following chemical structure:

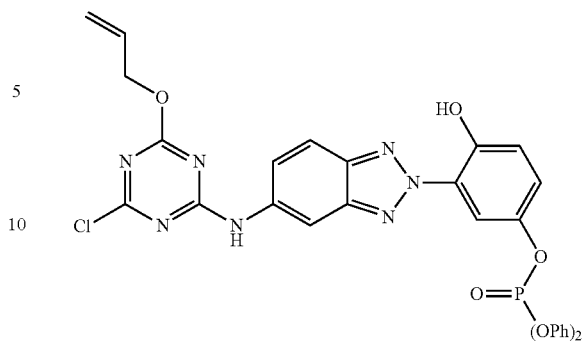

In the case of $R_2$, the intermediate molecule corresponds to the following chemical structure:

In the case of $R_3$, the intermediate molecule corresponds to the following chemical structure:

The subsequent chemical reactions depicted in FIG. 4A illustrate the formation of alternative HPB-FR molecules from the intermediate molecule. Specifically, the second chemical reaction of FIG. 4A illustrates a method of utilizing the intermediate molecule to form the HPB-FR(3) molecule having the following chemical structure:

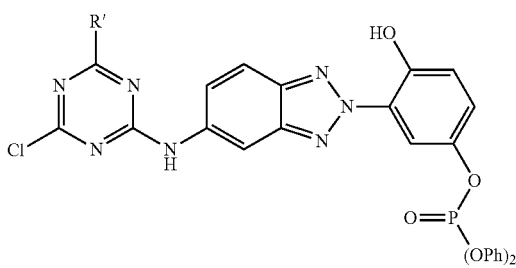

In the case of R₁, the HPB-FR(3) molecule corresponds to the following chemical structure:

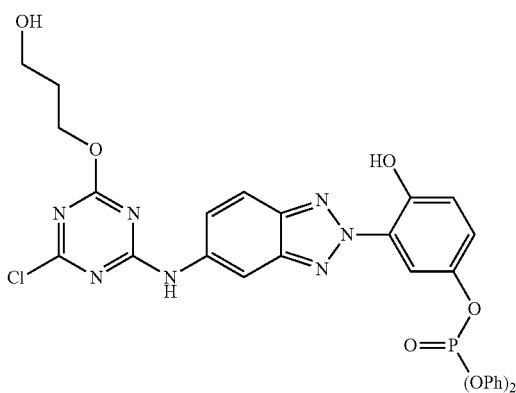

In the case of R₂, the HPB-FR(3) molecule corresponds to the following chemical structure:

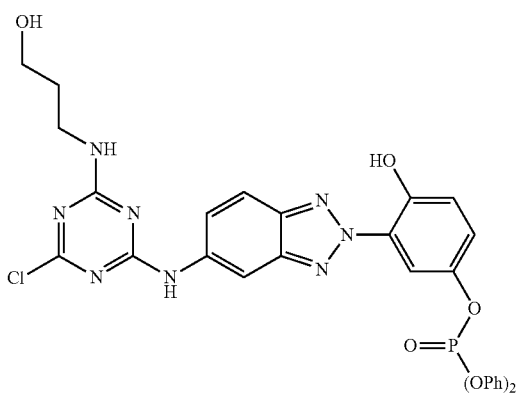

In the case of R₃, the HPB-FR(3) molecule corresponds to the following chemical structure:

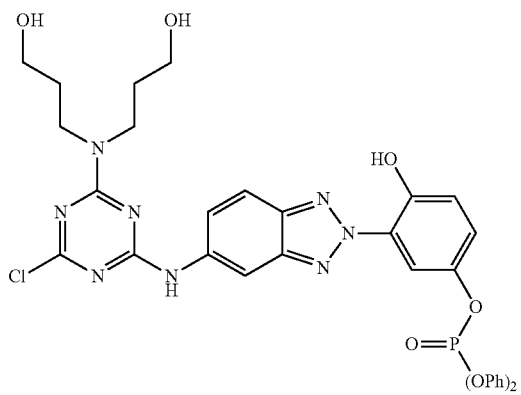

As a prophetic example, the intermediate molecule (having R₁, R₂, or R₃) may first be chemically reacted with 9-BBN in a solution of THF, followed by a reaction in an $H_2O_2$/NaOH solution.

The third chemical reaction depicted in FIG. 4A illustrates a method of utilizing the intermediate molecule to form the HPB-FR(4) molecule having the following chemical structure:

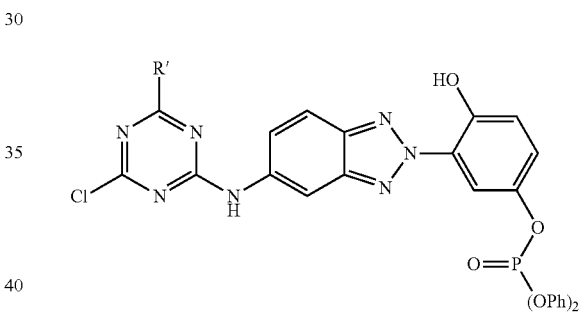

In the case of R₁, the HPB-FR(4) molecule corresponds to the following chemical structure:

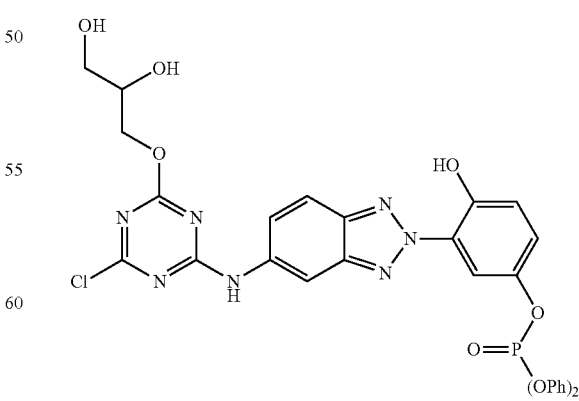

In the case of R₂, the HPB-FR(4) molecule corresponds to the following chemical structure:

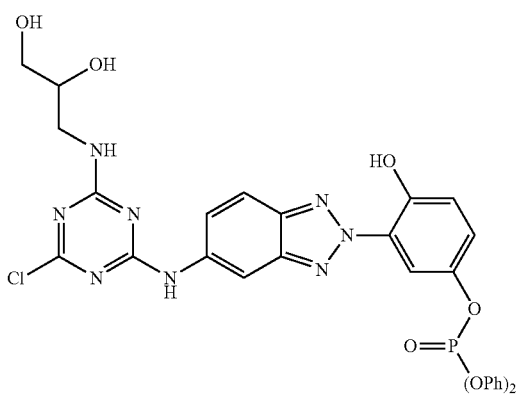

In the case of $R_3$, the HPB-FR(4) molecule corresponds to the following chemical structure:

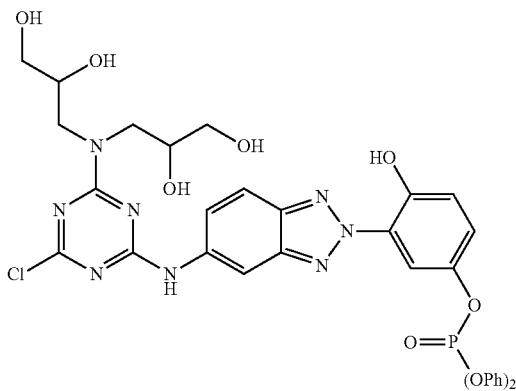

As a prophetic example, in the third chemical reaction of FIG. 4A, the reaction may utilize mCPBA followed by NaOH to form the additional hydroxyl group(s) of the HPB-FR(4) molecule.

Referring to FIG. 4B, starting with the silica particles formed according to the process described with respect to FIG. 1A, the particles may be re-dispersed in a solvent, and the HPB-FR(3) molecule of FIG. 4A may be added and the solution stirred for a few hours. After stirring the solution for a few hours, the particles may be centrifuged, washed, and dried to yield UV light stabilizing, flame retardant nanoparticles. The resulting particles are identified as "UV Light Stabilizing Polymeric Filler Material(5)" in FIG. 4B, with a callout view illustrating one of the surface-modified silica nanoparticles in detail.

Referring to FIG. 4C, starting with the silica particles formed according to the process described with respect to FIG. 1A, the particles may be re-dispersed in a solvent, and the HPB-FR(4) molecule of FIG. 4A may be added and the solution stirred for a few hours. After stirring the solution for a few hours, the particles may be centrifuged, washed, and dried to yield UV light stabilizing, flame retardant nanoparticles. The resulting particles are identified as "UV Light Stabilizing Polymeric Filler Material(6)" in FIG. 4C, with a callout view illustrating one of the surface-modified silica nanoparticles in detail.

Thus, FIGS. 4A-4C illustrate an example of a process of forming a UV light stabilizing polymeric filler material that includes a particle that is surface modified to include an HPB derivative functionality that includes a phosphorus-based flame retardant moiety. The surface-modified particles depicted in FIGS. 4B and 4C represents examples of mono-functionalized particles, in which an HPB derivative that includes a phosphorus-containing moiety is utilized to impart UV light stabilization characteristics as well as flame retardancy characteristics to the particle. The mono-functionalized particles of FIGS. 4B and 4C represent examples of a single additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the UV light stabilizing polymeric filler materials of FIGS. 4B and 4C may be satisfactory to prevent UV degradation in polycarbonate materials (as well as impart flame retardancy characteristics to the PC material).

FIGS. 5A-5B illustrate an example of a process of forming a UV light stabilizing polymeric filler material that includes a particle having a first portion that is surface modified to include an HPB derivative functionality with a phosphorus-based flame retardant moiety and second portion that is surface modified to include a matrix bonding functionality. FIG. 5A is a diagram 500 illustrating removal of wax after addition of a matrix bonding functionality to an exposed particle surface, and FIG. 5B is a diagram 510 illustrating surface modification of the half-functionalized particle of FIG. 5A with one of the HPB-FR molecules depicted in FIG. 3A or FIG. 4A (represented as "HPB-FR (x)" in FIG. 5B). The surface-modified particle depicted in FIG. 5B represents a second example of a "dual-functionalized" particle of the present disclosure, in which one portion of the particle is surface-modified to include the HPB derivative functionality with the phosphorus-based flame retardant moiety and another portion of the particle is surface-modified to include another functionality (e.g., matrix bonding functional groups). The HPB derivative functionality imparts UV light stabilization characteristics to the particle, the phosphorus-containing moiety imparts flame retardancy characteristics to the particle, and the matrix bonding functional groups enable the particle to be bound into a corresponding polymeric matrix.

While not shown in FIG. 5A, particles (that may be produced according to the process previously described herein with respect to FIG. 1A) are first modified to protect a portion of a surface of the particle. The left side of FIG. 5A illustrates that a first portion of the particle is exposed while a second portion of the particle is encapsulated (e.g., in paraffin wax). The right side of FIG. 5A illustrates that, after a first set of functional groups (e.g., matrix bonding functional groups) have been attached to the first portion of the particle, the wax encapsulant may be removed to expose the second portion of the particle. FIG. 5B illustrates that a second set of functional groups (e.g., the HPB derivative functionality with the phosphorus-based flame retardant moiety) may attached to the second portion of the particle to form a UV light stabilizing polymeric filler material. In FIG. 5B, HPB-FR(x) corresponds to HPB-FR(1) in the case of the first HPB-FR molecule of FIG. 3A, corresponds to HPB-FR(2) in the case of the second molecule of FIG. 3A, corresponds to HPB-FR(3) in the case of the first molecule of FIG. 4A, and corresponds to HPB-FR(4) in the case of the second molecule of FIG. 4B.

In the example of FIG. 5A, the first set of functional groups to be attached to the particle include matrix/resin bonding functional groups (e.g., allyl groups). In the example of FIG. 5B, the second set of functional groups to be attached to the particle include HPB-FR functional groups. In other cases, the first set of functional groups to be attached to the particle may include the HPB-FR functional groups, and the second set of functional groups to be attached to the particle may include the matrix bonding functional groups. Additionally, while FIG. 5A illustrates an example of the addition of vinyl functional groups to a silica particle, one of ordinary skill in the art will appreciate that alternative functional groups and/or particles may be utilized. Illustrative, non-limiting examples of alternative matrix bonding moieties may include amines, epoxies, vinyls, succinimides, or acrylates that may be selected for a particular polymeric resin type that the multiple-function filler material is to be bonded to (e.g., prior to an injection molding operation).

Thus, FIGS. 5A-5B illustrate an example of a process of forming a UV light stabilizing polymeric filler material that includes a particle having a first portion that is surface modified to include an HPB derivative functionality with a phosphorus-based flame retardant moiety and a second portion that is surface modified to include a matrix bonding functionality. The surface-modified particle depicted in FIG. 5B represents an example of a dual-functionalized particle, in which one portion of the particle is surface-modified to include the HPB derivative functionality with the phosphorus-containing moiety and another portion of the particle is surface-modified to include another functionality (e.g., matrix bonding functional groups). The HPB derivative functionality imparts UV light stabilization characteristics to the particle, the phosphorus-containing moiety imparts flame retardancy characteristics to the particle, and the matrix bonding functional groups enable the particle to be bound into a corresponding polymeric matrix. The dual-functionalized particle of FIG. 5B represents an example of a single additive that may replace multiple separate additives, resulting in advantages associated with process simplification, cost savings, or a combination thereof (among other possible advantages).

Figure 6A:
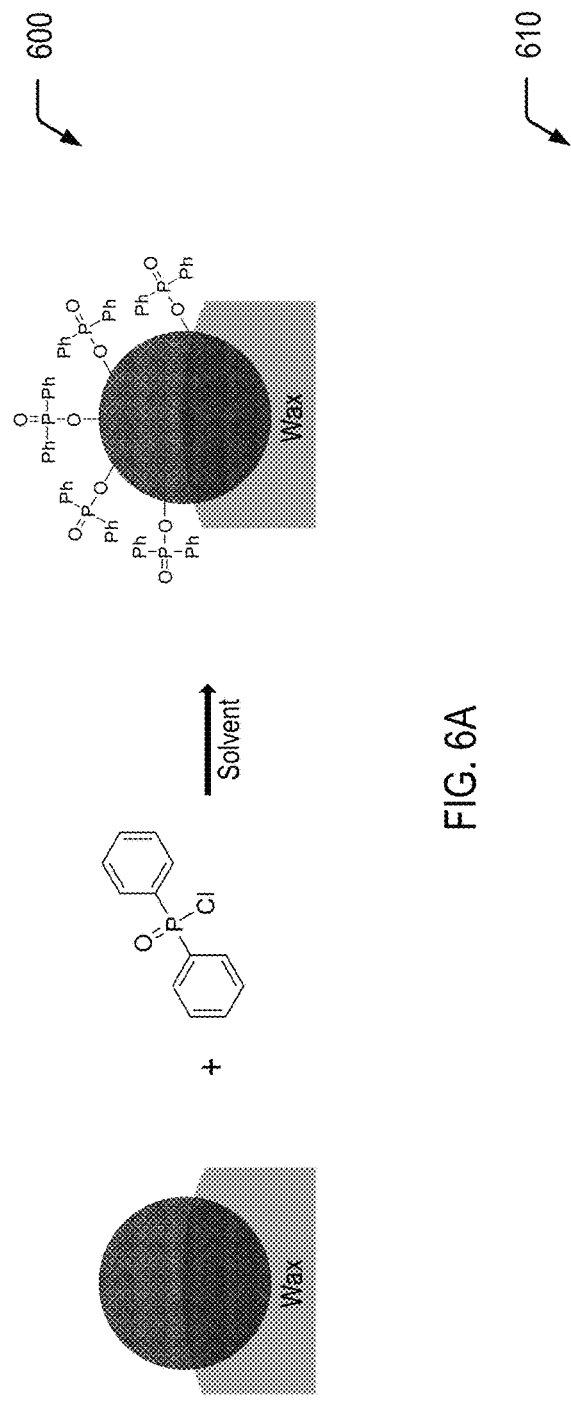
FIGS. 6A-6C illustrate an example of a process of forming a UV light stabilizing polymeric filler material that includes a particle having a first portion that is surface modified to include an HPB derivative functionality and second portion that is surface modified to include a phosphorus-based flame retardant moiety, according to one embodiment.
Figure 6B:
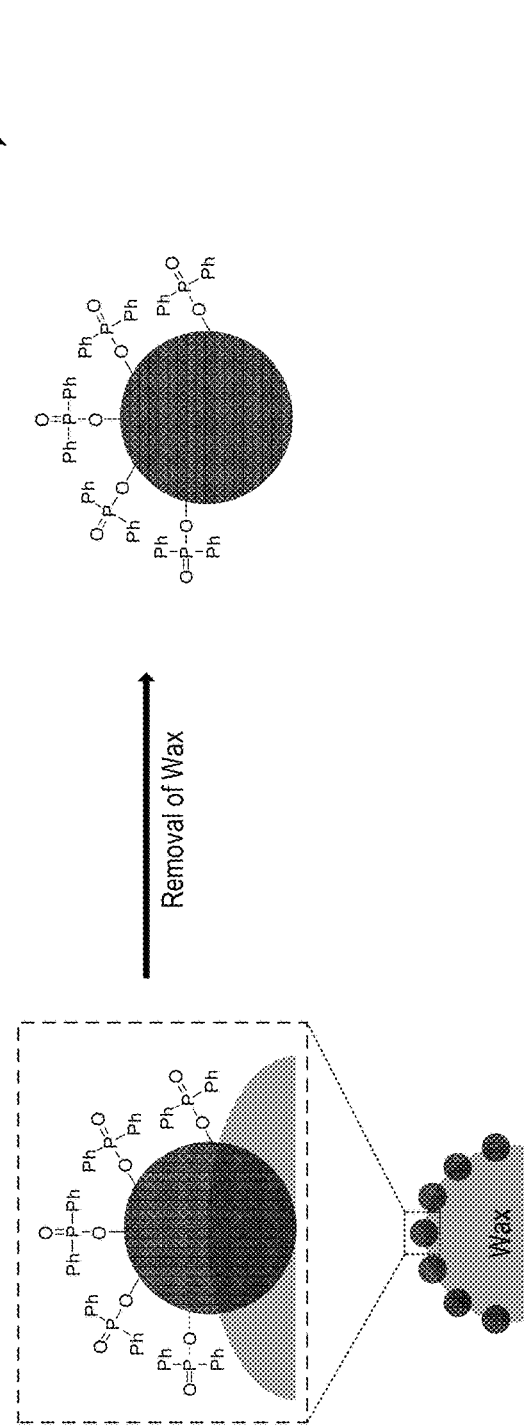
Figure 6C:
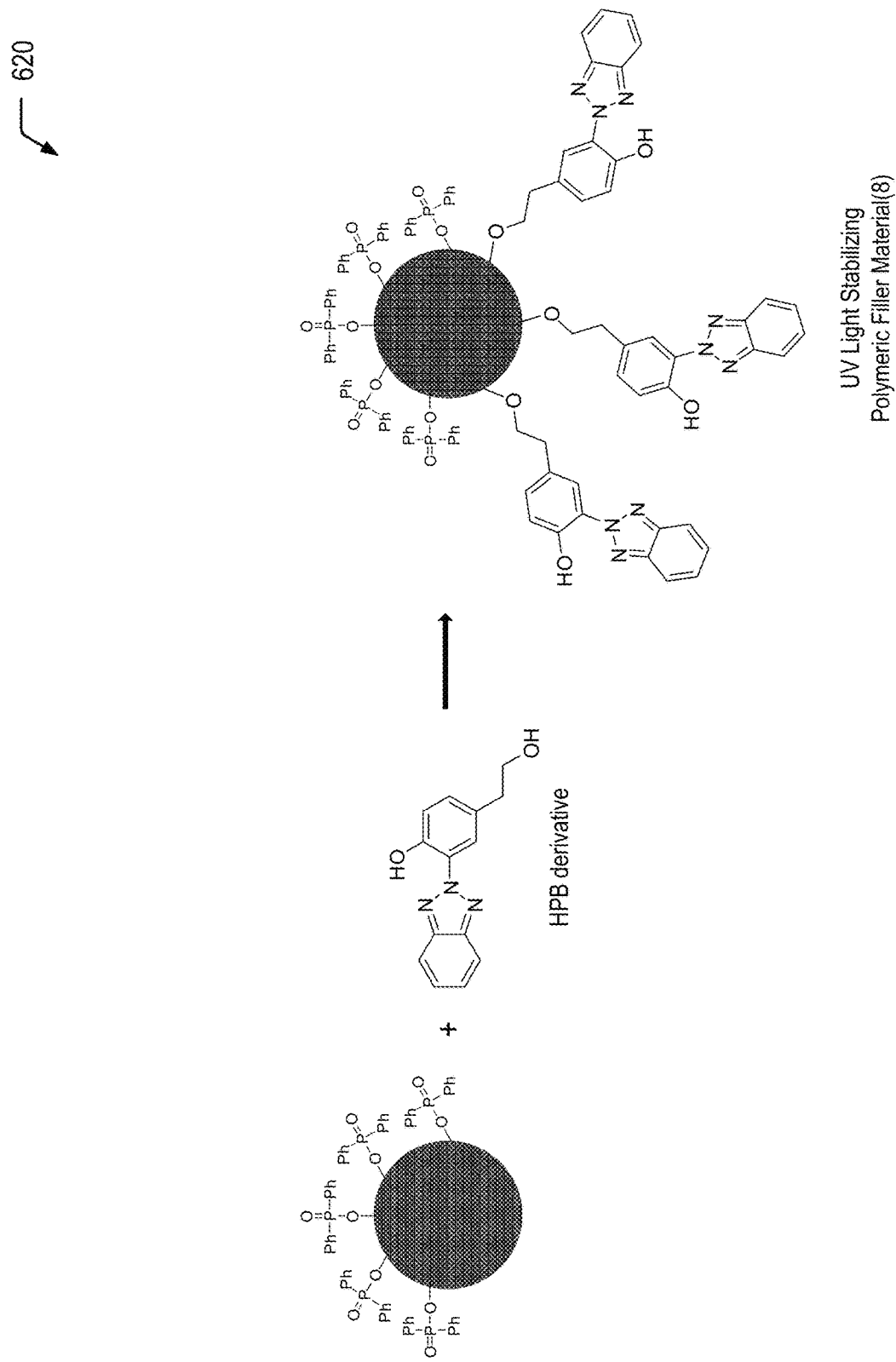

FIGS. 6A-6C illustrate an example of a process of forming a UV light stabilizing polymeric filler material that includes a particle having a first portion that is surface modified to include an HPB derivative functionality and a second portion that is surface modified to include a phosphorus-based flame retardant moiety. FIG. 6A is a diagram 600 illustrating addition of a phosphorus-containing moiety to an exposed particle surface, and FIG. 6B is a diagram 610 illustrating removal of a wax encapsulant to form a half-functionalized particle with a phosphorus-based flame retardant moiety. FIG. 6C is a diagram 620 illustrating addition of an HPB derivative functionality to the half-functionalized particle of FIG. 6B to form a dual-functionalized particle having an HPB derivative functionality and a phosphorus-based flame retardant functionality. The HPB derivative functionality imparts UV light stabilization characteristics to the particle, and the phosphorus-based flame retardant functionality imparts flame retardancy characteristics to the particle.

While not shown in FIG. 6A, the wax-encapsulated silica particles depicted on the left side of FIG. 6A may be formed according to the process previously described herein with respect to FIG. 2A. FIG. 6A illustrates that functionalization of the exposed particle surface may be performed by reacting a phosphorus-containing molecule (e.g., diphenylphosphoryl chloride in the example of FIG. 6A) with the exposed particle surface. To proceed with the surface modification of the particle, the colloidosomes are reacted in their original emulsions and with a diphenylphosphoryl chloride solution under neat conditions. This functionalizes the particle's surface yielding particles having flame retardant chemistries. FIG. 6B illustrates subsequent removal of the wax to afford phosphorus-containing "Janus" silica particles. In an alternative embodiment, the particles may be reacted with the diphenylphosphoryl chloride solution in an emulsion that is not the original emulsion. For examples, the particles may be isolated, then re-suspended in an organic solvent, followed by the addition of diphenylphosphoryl chloride. An anhydrous, polar aprotic solvent may be suitable to enable dissolving but not reacting with the diphenylphosphoryl chloride while not dissolving the wax either.

With respect to FIG. 6C, in order to attach the UV light stabilizer to the particle, the following procedure can be utilized. This functionalization may be performed by reacting an HPB derivative (e.g., 3-(2H-benzotriazol-2-yl)-4-hydroxy-benzeneethanol in the illustrative example of FIG. 6C, among other alternatives) with the exposed "free" particle surface. To proceed with the surface modification of the particle, the previously modified particles of FIG. 6B are reacted with a 3-(2H-benzotriazol-2-yl)-4-hydroxy-benzeneethanol solution. The process of reacting an alkyl/aryl hydroxyl moiety with the silica particles of FIG. 6B may utilize a tin catalyst, such as tin(II) octanoate. As previously described herein, for some alternative HPB derivatives, the process of reacting the hydroxyl moiety with the silica particles of FIG. 6B may utilize an organic acid catalyst. The resulting particle is identified as "UV Light Stabilizing Polymeric Filler Material(8)" on the right side of FIG. 6C.

Thus, FIGS. 6A-6C illustrate an example of a process of forming a UV light stabilizing polymeric filler material that includes a particle having a first portion that is surface modified to include an HPB derivative functionality and a second portion that is surface modified to include a phosphorus-based flame retardant moiety. The surface-modified particle depicted in FIG. 6C represents an example of a dual-functionalized particle, in which one portion of the particle is surface-modified to include the HPB derivative functionality and another portion of the particle is surface-modified to include a phosphorus-based moiety. The HPB derivative functionality imparts UV light stabilization characteristics to the particle, and the phosphorus-containing moiety imparts flame retardancy characteristics to the particle. The dual-functionalized particle of FIG. 6C represents an example of a single additive that may replace multiple separate additives, resulting in advantages associated with process simplification, cost savings, or a combination thereof (among other possible advantages).

Figure 7:
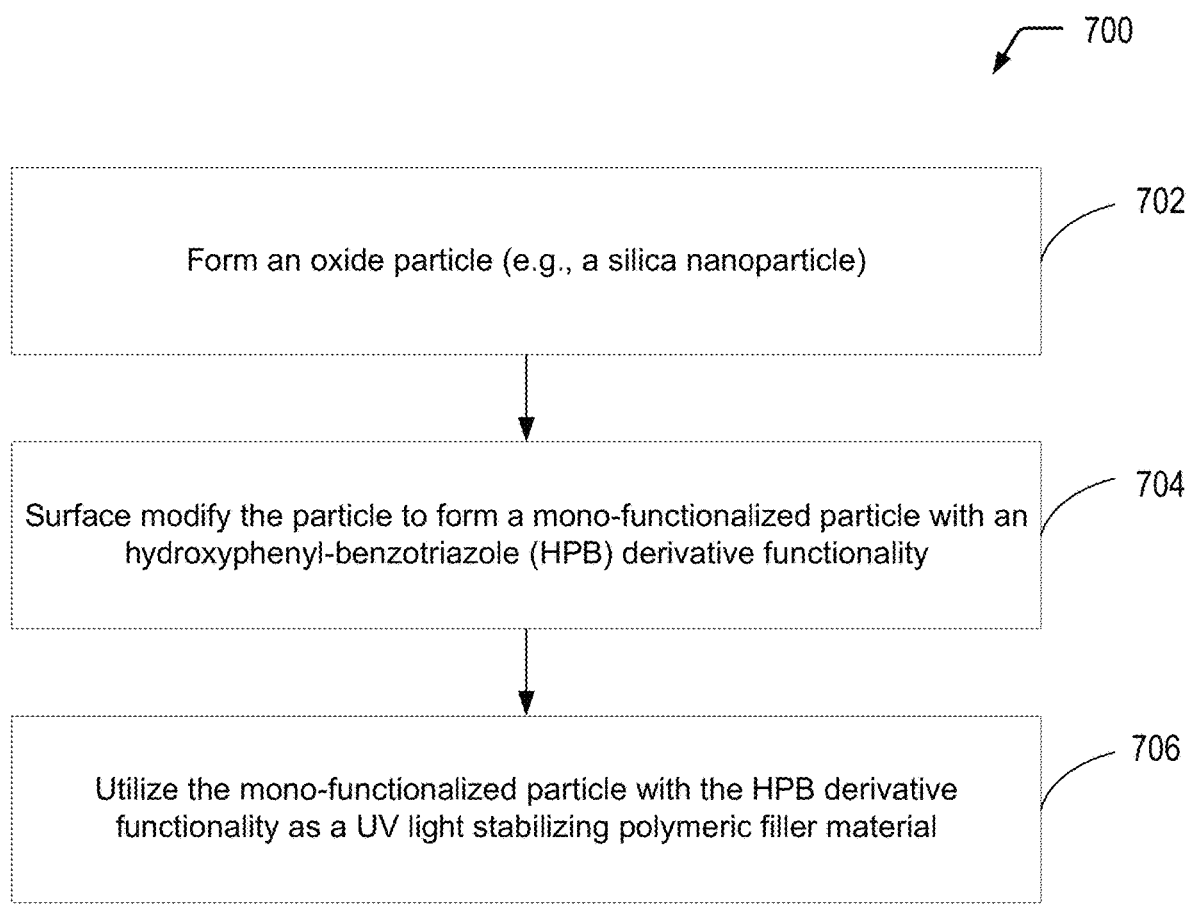
FIG. 7 is a flow diagram illustrating an example of a process of forming a UV light stabilizing polymeric filler material that includes a particle that is surface modified to include an HPB derivative functionality, according to one embodiment.

Referring to FIG. 7, a flow diagram illustrates a particular embodiment of a process 700 of forming a UV light stabilizing polymeric filler material that includes a particle that is surface modified to include an HPB derivative functionality (also referred to herein as a "mono-functionalized" particle). In the particular embodiment depicted in FIG. 7, the process 700 further includes utilizing the mono-functionalized particle as a polymeric filler material. It will be appreciated that the operations shown in FIG. 7 are for illustrative purposes only and that the operations may be performed in alternative orders, at alternative times, by a single entity or by multiple entities, or a combination thereof. As an example, one entity may produce the particles (operation 702), while the same entity or a different entity may surface modify the particles (operation 704). Further, alternative or additional entities may utilize the surface-modified particles as a UV light stabilizing polymeric filler material (operation 706).

The process 700 includes forming an oxide particle, at 702. For example, referring to FIG. 1A, the oxide particle may correspond to a silica particle that may be prepared through a modified Stober et al. synthesis. In a particular embodiment, the resulting silica particles may correspond to silica "nanoparticles" having a characteristic dimension (e.g., an average diameter of a substantially spherical silica particle) in a range of 1 nm to 1 μm.

The process 700 includes surface modifying the particle to form a mono-functionalized particle with an HPB derivative functionality, at 704. As an example, the mono-functionalized particle may correspond to the UV light stabilizing polymeric filler material depicted in FIG. 1B, in which binding the HPB derivative molecule depicted on the left side of FIG. 1B to the surface of the silica particle imparts UV light stabilization characteristics to the particle. As another example, the mono-functionalized particle may correspond to the UV light stabilizing polymeric filler materials depicted in FIGS. 3B and 3C, in which binding the HPB-FR derivative molecules HPB-FR(1) or HPB-FR(2) depicted in FIG. 3A to the surface of the silica particle imparts UV light stabilization characteristics as well as flame retardancy characteristics to the particle. As a further example, the mono-functionalized particle may correspond to the UV light stabilizing polymeric filler materials depicted in FIGS. 4B and 4C, in which binding the HPB-FR derivative molecules HPB-FR(3) or HPB-FR(4) depicted in FIG. 4A to the surface of the silica particle imparts UV light stabilization characteristics as well as flame retardancy characteristics to the particle.

In the particular embodiment depicted in FIG. 7, the process 700 further includes utilizing the mono-functionalized particle with the HPB derivative functionality as a UV light stabilizing polymeric filler material, at 706. As an example, the mono-functionalized particles of FIGS. 1B, 3B-3C, and 4B-4C may be used to form an article of manufacture that includes a polymeric material, such as a polycarbonate material.

Thus, FIG. 7 illustrates an example of a process of forming a UV light stabilizing polymeric filler material that includes a particle that is surface modified to include an HPB derivative functionality. The UV light stabilizing polymeric filler material represents a single additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the UV light stabilizing polymeric filler materials may be satisfactory to prevent UV degradation in polycarbonate materials.

Figure 8:
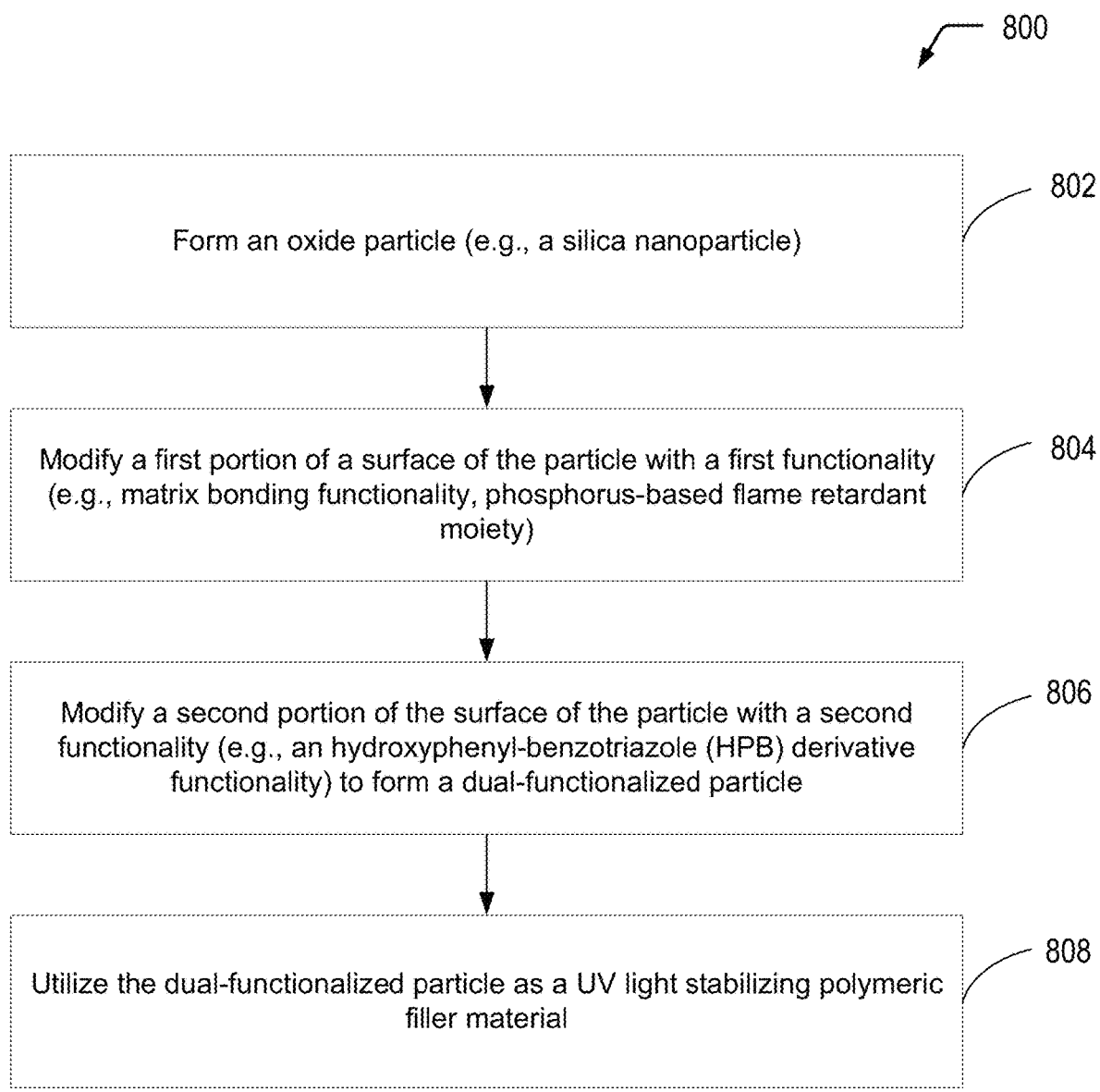
FIG. 8 is a flow diagram illustrating an example of a process of forming a UV light stabilizing polymeric filler material that includes a particle having a first portion that is surface modified to include an HPB derivative functionality and a second portion that is surface modified to include a second functionality, according to one embodiment.

Referring to FIG. 8, a flow diagram illustrates a particular embodiment of a process 800 of forming a UV light stabilizing polymeric filler material that includes a particle having a first portion that is surface modified to include an HPB derivative functionality and a second portion that is surface modified to include a second functionality (also referred to herein as a "dual-functionalized" particle). In the particular embodiment depicted in FIG. 8, the process 800 further includes utilizing the dual-functionalized particle as a polymeric filler material. It will be appreciated that the operations shown in FIG. 8 are for illustrative purposes only and that the operations may be performed in alternative orders, at alternative times, by a single entity or by multiple entities, or a combination thereof. As an example, one entity may produce the particles (operation 802), while the same/different entity(s) may surface modify portion(s) of the particles (operations 804 and 806). Further, alternative or additional entities may utilize the surface-modified particles as a UV light stabilizing polymeric filler material (operation 808).

The process 800 includes forming an oxide particle, at 802. For example, referring to FIG. 1A, the oxide particle may correspond to a silica particle that may be prepared through a modified Stober et al. synthesis. In a particular embodiment, the resulting silica particles may correspond to silica "nanoparticles" having a characteristic dimension (e.g., an average diameter of a substantially spherical silica particle) in a range of 1 nm to 1 μm.

The process 800 includes surface modifying a first portion of a surface of the particle with a first functionality, at 804. For example, referring to FIGS. 2B-2C and 5A, the first portion of the surface of the silica particle may be modified to include the matrix bonding functionality (e.g., allyl groups). As another example, referring to FIG. 6A, the first portion of the surface of the silica particle may be modified to include the phosphorus-containing moiety.

The process 800 includes surface modifying a second portion of the surface of the particle with a second functionality to form a dual-functionalized particle, at 804. For example, referring to FIG. 2D, the surface-modified particle of FIG. 2C may be modified with the HPB derivative functionality to form the dual-functionalized particle having the matrix bonding functionality (to enable the particle to be bound into a polymer matrix) and the HPB derivative functionality (to impart UV light stabilization characteristics). As another example, referring to FIG. 5B, the surface-modified particle of FIG. 5A may be modified with one of the HPB-FR functionalities depicted in FIGS. 3A and 4A to form the dual-functionalized particle having the matrix bonding functionality (to enable the particle to be bound into a polymer matrix) and the HPB-FR functionality (to impart UV light stabilization characteristics as well as flame retardancy characteristics). As a further example, referring to FIG. 6C, the surface-modified particle of FIG. 6B may be modified with an HPB derivative functionality to form the dual-functionalized particle having the phosphorus-containing moiety (to impart flame retardancy characteristics) and the HPB derivative functionality (to impart UV light stabilization characteristics).

In the particular embodiment illustrated in FIG. 8, the process 800 further includes utilizing the dual-functionalized particle as a UV light stabilizing polymeric filler material, at 808. As an example, the dual-functionalized particles of FIGS. 2D, 5B, and 6C may be used to form an article of manufacture that includes a polymeric material, such as a polycarbonate material.

Thus, FIG. 8 illustrates an example of a process of forming a UV light stabilizing polymeric filler material that includes a particle having a first portion that is surface modified to include an HPB derivative functionality and a second portion that is surface modified to include a second functionality. The UV light stabilizing polymeric filler material represents a single additive that may replace multiple separate additives, resulting in advantages associated with process simplification, cost savings, or a combination thereof (among other possible advantages). Further, as the UV light stabilizing characteristics are associated with an HPB derivative functionality rather than a HALS functionality, the UV light stabilizing polymeric filler materials may be satisfactory to prevent UV degradation in polycarbonate materials.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An ultraviolet (UV) light stabilizing polymeric filler material that includes a particle that is surface modified to include a hydroxyphenyl-benzotriazole (HPB) derivative functionality, forming a Janus particle, wherein the Janus particle comprises:
    a first portion of a surface of the Janus particle, the first portion surface modified to include the HPB derivative functionality, and
    a second portion of the surface of the Janus particle, the second portion surface modified to include a second functionality, wherein the second portion is different than the first portion.

2. The UV light stabilizing polymeric filler material of claim 1, wherein the Janus particle includes a silica nanoparticle having a characteristic dimension in a range of 1 nm to 1 μm.

3. The UV light stabilizing polymeric filler material of claim 1, wherein a first portion of the particle is surface modified to include the HPB derivative functionality, and wherein a second portion of the particle is surface modified to include a matrix bonding functionality.

4. The UV light stabilizing polymeric filler material of claim 3, wherein the matrix bonding functionality includes vinyl groups, amine groups, epoxy groups, allyl groups, succinimide groups, or acrylate groups.

5. The UV light stabilizing polymeric filler material of claim 1, wherein the HPB derivative functionality further includes a phosphorus-based flame retardant moiety.

6. The UV light stabilizing polymeric filler material of claim 5, wherein a first portion of the particle is surface modified to include the HPB derivative functionality that includes the phosphorus-based flame retardant moiety, and wherein a second portion of the particle is surface modified to include a matrix bonding functionality.

7. The UV light stabilizing polymeric filler material of claim 6, wherein the matrix bonding functionality includes vinyl groups, amine groups, epoxy groups, allyl groups, succinimide groups, or acrylate groups.

8. The UV light stabilizing polymeric filler material of claim 1, wherein a first portion of the particle is surface modified to include the HPB derivative functionality, and wherein a second portion of the particle is surface modified to include a phosphorus-containing flame retardant moiety.

9. A process of forming an ultraviolet (UV) light stabilizing polymeric filler material, the process comprising:
    surface modifying a first portion of a surface of a silica particle to include a hydroxyphenyl-benzotriazole (HPB) derivative functionality, forming a silica Janus particle; and
    surface modifying a second portion of the surface of the silica Janus particle to include a second functionality, wherein the second portion is different than the first portion.

10. The process of claim 9, wherein the HPB derivative functionality further includes a phosphorus-based flame retardant moiety.

11. The process of claim 9, wherein the second functionality includes a matrix bonding functionality.

12. The process of claim 11, wherein the matrix bonding functionality includes vinyl groups, amine groups, epoxy groups, allyl groups, succinimide groups, or acrylate groups.

13. The process of claim 9, wherein the second functionality includes a phosphorus-based flame retardant moiety.

14. An article of manufacture comprising:
    a polymeric material; and
    an ultraviolet (UV) light stabilizing polymeric filler material that includes a silica particle that is surface modified to include a hydroxyphenyl-benzotriazole (HPB) derivative functionality, forming a silica Janus particle, wherein the silica Janus particle comprises:
        a first portion of a surface of the silica Janus particle, the first portion surface modified to include the HPB derivative functionality, and
        a second portion of the surface of the silica Janus particle, the second portion surface modified to include a second functionality, wherein the second portion is different from the first portion.

15. The article of manufacture of claim 14, wherein the polymeric material includes a polycarbonate (PC) material.

16. The article of manufacture of claim 14, wherein the HPB derivative functionality further includes a phosphorus-containing flame retardant moiety.

17. The article of manufacture of claim 14, wherein the second functionality includes a matrix bonding functionality, the matrix bonding functionality including vinyl groups, amine groups, epoxy groups, allyl groups, succinimide groups, or acrylate groups.

18. The article of manufacture of claim 14, wherein the second functionality includes a phosphorus-based flame retardant moiety.

* * * * *